(12) United States Patent
Suzuki

(10) Patent No.: US 11,652,645 B2
(45) Date of Patent: May 16, 2023

(54) STORAGE MEDIUM, COMMUNICATION METHOD, AND COMMUNICATION DEVICE

(71) Applicant: FUJITSU LIMITED, Kawasaki (JP)

(72) Inventor: Dai Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 16/891,159

(22) Filed: Jun. 3, 2020

(65) Prior Publication Data

US 2020/0389324 A1    Dec. 10, 2020

(30) Foreign Application Priority Data

Jun. 6, 2019    (JP) .............................. JP2019-105844

(51) Int. Cl.
    *H04L 9/32*      (2006.01)
    *H04L 9/06*      (2006.01)
    (Continued)

(52) U.S. Cl.
CPC ............ *H04L 9/3263* (2013.01); *G06F 21/33* (2013.01); *H04L 9/006* (2013.01); *H04L 9/0637* (2013.01);
(Continued)

(58) Field of Classification Search
CPC ..... H04L 9/3263; H04L 9/006; H04L 9/0637; H04L 9/3268; H04L 41/0686;
(Continued)

(56) References Cited

U.S. PATENT DOCUMENTS

| | | |
|---|---|---|
| 2005/0228886 A1 | 10/2005 | Cain et al. |
| 2006/0080312 A1 | 4/2006 | Friedlander et al. |
| | (Continued) | |

FOREIGN PATENT DOCUMENTS

| | | |
|---|---|---|
| JP | 2008-71226 A | 3/2008 |
| JP | 2011-525028 A | 9/2011 |

OTHER PUBLICATIONS

Shitsu Kiyouko, JP 2008-71226 JP machine translation, Mar. 27, 2008 (Year: 2008).*

(Continued)

*Primary Examiner* — Luu T Pham
*Assistant Examiner* — Canh Le
(74) *Attorney, Agent, or Firm* — Fujitsu Patent Center

(57) ABSTRACT

A communication device includes circuitry configured to acquire a digital certificate including information associated with a first attribute from a first device coupled to any of a plurality of devices sharing a distributed ledger having recorded therein a correspondence between an attribute of user information included in the digital certificate and a definition of the attribute, receive a request for information associated with a second attribute from a second device coupled to any of the plurality of devices, acquire a first definition associated with the first attribute, and a second definition associated with the second attribute, from any of the plurality of devices, and transmit a digital certificate including information associated with the first attribute to the second device together with a message notifying that the first attribute and the second attribute have the same definition, when the first definition and the second definition match.

10 Claims, 21 Drawing Sheets

(51) Int. Cl.
    *H04L 41/0686*     (2022.01)
    *H04L 43/16*     (2022.01)
    *H04L 51/06*     (2022.01)
    *H04L 9/40*     (2022.01)
    *G06F 21/33*     (2013.01)
    *H04L 9/00*     (2022.01)

(52) U.S. Cl.
    CPC ........ *H04L 9/3268* (2013.01); *H04L 41/0686* (2013.01); *H04L 43/16* (2013.01); *H04L 51/06* (2013.01); *H04L 63/0823* (2013.01); *H04L 63/102* (2013.01); *H04L 63/12* (2013.01)

(58) Field of Classification Search
    CPC ..... H04L 43/16; H04L 51/06; H04L 63/0823; H04L 63/102; H04L 63/12; H04L 9/32; G06F 21/33; H04W 12/069
    See application file for complete search history.

(56) References Cited

U.S. PATENT DOCUMENTS

| | | |
|---|---|---|
| 2009/0320095 A1 | 12/2009 | Nanda et al. |
| 2012/0239435 A1* | 9/2012 | Ennett .................... G16H 10/40 705/3 |
| 2013/0117558 A1 | 5/2013 | Metke et al. |
| 2018/0075686 A1* | 3/2018 | Campero ............. G06Q 20/389 |
| 2019/0096021 A1* | 3/2019 | Jarvis ................. G06Q 20/4012 |
| 2020/0019616 A1* | 1/2020 | Sukhija ............... G06F 16/2255 |
| 2020/0164886 A1* | 5/2020 | Dutta .................. G06F 21/6227 |

OTHER PUBLICATIONS

Samuel Tanner Lindemer, "Digital Certificate Revocation for the Internet of Things," 2019, pp. 1-44. (Year: 2019).*

John M. Blythe et al., "What security features and crime prevention advice is communicated in consumer IoT device manuals and support pages?" 2019, pp. 1-10. (Year: 2019).*

EESR—Extended European Search Report of European Patent Application No. 20177405.6 dated Oct. 23, 2020.

CNOA—Office Action of Chinese Patent Application No. 202010494595.6 dated Apr. 27, 2020 with an English translation. ** References cited in the CNOA were previously submitted in the IDS filed on Jun. 3, 2020 and Jan. 6, 2021.

* cited by examiner

FIG. 4

| ATTRIBUTE DEFINITION ID | ATTRIBUTE | ATTRIBUTE DEFINITION |
|---|---|---|
| A1 | NAME | LAST NAME, CHINESE CHARACTERS |
| A2 | ISSUER | AGENT ID, NUMERAL |
| A3 | ADDRESS | PREFECTURE NAME, CHINESE CHARACTERS |
| A4 | ANNUAL INCOME | ANNUAL INCOME, 10,000 YEN |
| ... | ... | ... |
| A10 | FULL NAME | LAST NAME, CHINESE CHARACTERS |
| A11 | NAME | LAST NAME, ROMAN CHARACTERS |
| A12 | INCOME | ANNUAL INCOME, 10,000 YEN |
| ... | ... | ... |

| COMMUNICATION DEVICE | AGENT ID | PUBLIC KEY | ADDRESS |
|---|---|---|---|
| COMMUNICATION DEVICE 20a | 3 | KeyB | IPa |
| COMMUNICATION DEVICE 20b | 1 | KeyD | IPb |
| COMMUNICATION DEVICE 20c | 2 | KeyF | IPc |
| ... | ... | ... | ... |

FIG. 5

```
                                          18
┌─────────────────────────────────┐
│ SCHEMA DEFINITION               │
│         SCHEMA ID: SC_1         │
│             A2                  │
│             A1                  │
│             ...                 │
└─────────────────────────────────┘

CL
┌─────────────────────────────────┐
│ CREDENTIAL                      │
│         CREDENTIAL ID: CID_1    │
│         SCHEMA ID: SC_1         │
│             A2: 3               │
│             A1: SUZUKI          │
│             ...                 │
└─────────────────────────────────┘
```

FIG. 8

| ATTRIBUTE 1 | | ATTRIBUTE 2 (CORRESPONDING TO ATTRIBUTE 1) | |
|---|---|---|---|
| ATTRIBUTE DEFINITION ID | ATTRIBUTE | ATTRIBUTE DEFINITION ID | ATTRIBUTE |
| A1 | NAME | A10 | FULL NAME |
| ... | ... | ... | ... |

| MESSAGE CREATOR ID | CORRESPONDING ATTRIBUTE | F1 |
|---|---|---|

| ID=1 | A1=A10 | F2 |
|---|---|---|

| ATTRIBUTE DEFINITION ID | ATTRIBUTE | ATTRIBUTE DEFINITION |
|---|---|---|
| A1 | NAME | LAST NAME, CHINESE CHARACTERS, |
| A2 | ISSUER | AGENT ID, NUMERAL |
| ... | ... | ... |

16b

| ATTRIBUTE DEFINITION ID | ATTRIBUTE | ATTRIBUTE DEFINITION |
|---|---|---|
| A2 | FULL NAME | LAST NAME, CHINESE CHARACTERS, |
| A3 | ISSUER | AGENT ID, NUMERAL |
| ... | ... | ... |

FIG. 15

| ATTRIBUTE 1 | | | ATTRIBUTE 2 (CORRESPONDING TO ATTRIBUTE 1) | | |
|---|---|---|---|---|---|
| CONSORTIUM | ATTRIBUTE DEFINITION ID | ATTRIBUTE | CONSORTIUM | ATTRIBUTE DEFINITION ID | ATTRIBUTE |
| C1 | A1 | NAME | C2 | A2 | FULL NAME |
| ... | ... | ... | ... | ... | ... |

MESSAGE TYPE: ATTRIBUTE CORRESPONDENCE MESSAGE

☐ SENDER ID: 5

☐ ID OF CONSORTIUM THAT DEFINED ATTRIBUTE 1: C1

☐ ATTRIBUTE DEFINITION ID OF ATTRIBUTE 1: A1

☐ ATTRIBUTE OF ATTRIBUTE 1: NAME

☐ ID OF CONSORTIUM THAT DEFINED ATTRIBUTE 2: C2

☐ ATTRIBUTE DEFINITION ID OF ATTRIBUTE 2: A2

☐ ATTRIBUTE OF ATTRIBUTE 2: FULL NAME

STORAGE MEDIUM, COMMUNICATION METHOD, AND COMMUNICATION DEVICE

CROSS-REFERENCE TO RELATED APPLICATION

This application is based upon and claims the benefit of priority of the prior Japanese Patent Application No. 2019-105844, filed on Jun. 6, 2019, the entire contents of which are incorporated herein by reference.

FIELD

The present invention is related to a storage medium, a communication method and a communication device.

BACKGROUND

When using various services such as online shopping, application for issuing a credit card, and opening a bank account, a service user may present a digital certificate to a service provider. A digital certificate may be issued by a certificate authority. In this case, the certificate authority performs identity confirmation and the like for a user and issues a certificate based on the result. The user presents the obtained digital certificate to the service provider, Since the service provider previously stores the format of the certificate, the service provider may acquire information certified by the digital certificate.

In recent years, a distributed ledger technology that has emerged as a platform for realizing virtual currency has attracted attention. The use of a distributed ledger may suppress information from being tampered with without the presence of a central administrator of the system, and application to areas other than virtual currency is also being studied.

As a related technique, for example, Japanese National Publication of International Patent Application No. 2011-525028 discloses a method for obtaining a token for accessing a service of a relying party from an identity provider.

As a related technique, for example, Japanese Laid-open Patent Publication No. 2008-71226 discloses a system in which a device belonging to a first security domain stores a credential B corresponding to a second security domain and a credential A in a system of the first security domain in association with each other. In this system, the device belonging to the first security domain acquires the credential B from a repository server by using the credential A and transmits the credential B to a communication destination device in the second security domain.

SUMMARY

According to an aspect of the embodiments, a non-transitory computer-readable storage medium storing a communication program causing a communication device to execute a process, the process includes acquiring a digital certificate including information associated with a first attribute from a first device coupled to any of a plurality of devices sharing a distributed ledger having recorded therein a correspondence between an attribute of user information included in the digital certificate and a definition of the attribute, upon receiving a request for information associated with a second attribute from a second device coupled to any of the plurality of devices, acquiring a first definition associated with the first attribute, and a second definition associated with the second attribute from any of the plurality of devices, and when the first definition and the second definition match, transmitting a digital certificate including information associated with the first attribute to the second device together with a message notifying that the first attribute and the second attribute have the same definition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of information shared by using a distributed ledger;

FIG. 5 is a diagram illustrating an example of a credential format;

FIG. 8 is a diagram illustrating an example of an attribute correspondence table;

FIG. 9 is a diagram illustrating an example of an attribute correspondence message;

FIG. 14 is a diagram illustrating an example of an attribute definition shared by each consortium;

FIG. 15 is a diagram illustrating an example of the attribute correspondence table;

FIG. 16 is a diagram illustrating an example of the attribute correspondence message;

DESCRIPTION OF EMBODIMENTS

In a system without a central administrator, there is a possibility that issuance of a certificate or the like is performed by a device other than a specific certificate authority. For example, a system may be designed in which any device in the system may issue a digital certificate. However, when a digital certificate is issued by a device other than a specific device, the name indicating the type of information certified by the digital certificate may be different depending on the device that issues the certificate. Different names may be used for the same information between the provider requesting the digital certificate and the device that issuing the digital certificate. In this case, even if the user sends a digital certificate including the information requested from the provider device to the provider device, since the name associated with the requested information is different from the name used by the provider, the provider device does not recognize the information in the certificate, and the verification fails. If the verification of the information using the digital certificate fails, since the provider accepts a self-report from the user for the information requested by the user and separately verifies whether the report from the user is correct, the cost and time are wasted, and the efficiency of the verification processing is reduced.

An object of the present invention is to suppress a reduction in efficiency of verification processing as one aspect.

A reduction in the efficiency of the verification processing may be suppressed.

Figure 1:
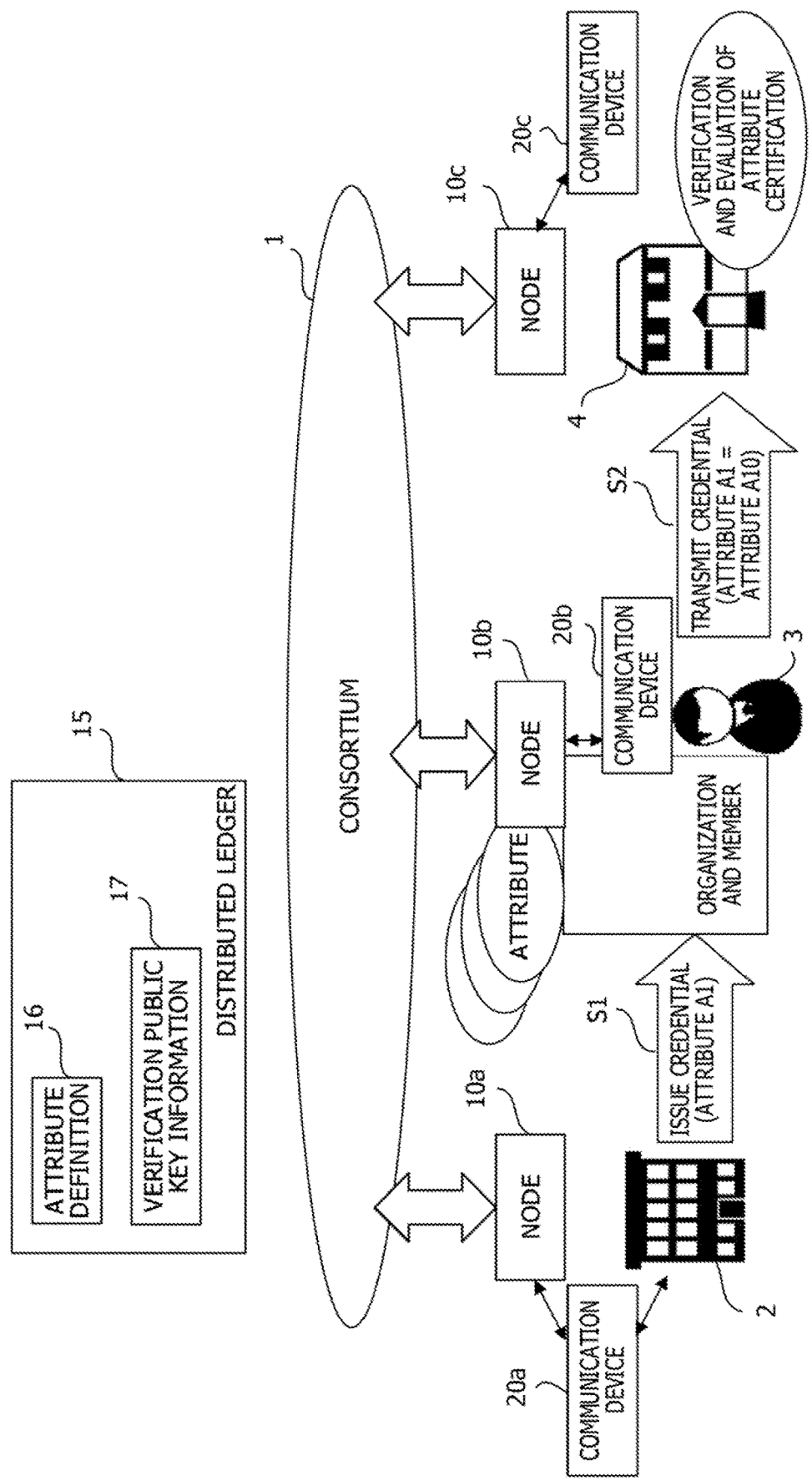
FIG. 1 is a diagram illustrating an example of a communication method according to an embodiment.

FIG. 1 is a diagram illustrating an example of a communication method according to an embodiment. In FIG. 1, an issuer 2 issues a digital certificate (credential). It is assumed that a holder 3 requests the issuer 2 for a digital certificate that certifies information about the holder 3. The holder 3 has information on various attributes such as a name and an address. The holder 3 may be an individual user or an organization. The verifier 4 requests the holder 3 to certify information about the holder 3 as appropriate. The issuer 2 uses a communication device 20a. Similarly, it is assumed that the holder 3 uses a communication device 20b and a verifier 4 uses a communication device 20c.

A network contains one or more consortia (clusters). Each consortium is a cluster of any type that may share a distributed ledger 15 and may be, for example, a consortium in blockchain technology.

A plurality of nodes 10 (10a to 10c) participating in a consortium 1 share the distributed ledger 15. Although three nodes 10 are illustrated in the example of FIG. 1, the number of nodes 10 included in the consortium 1 may be randomly changed according to the implementation. The distributed ledger 15 includes an attribute definition 16 and may optionally include verification public key information 17. The attribute definition 16 is a correspondence between a name (attribute) representing the type of user information certified by the digital certificate and the definition of the attribute. For example, the attribute definition 16 may include that the attribute "name" is a character string representing the user's last name in Chinese characters. A plurality of attributes may be associated with one definition. For example, in the attribute definition 16, the fact that the attribute "full name" is a character string representing the user's last name in Chinese characters may also be recorded. In the following description, it is assumed that identification information for identifying the attribute is assigned to each of the attributes. In the example of FIG. 1, it is assumed that the identification information of A1 is assigned to an attribute of "name" and A10 is assigned to an attribute of "full name". The verification public key information 17 includes information such as a public key paired with a secret key that may be used by each communication device 20 for encryption.

Each of the nodes 10 may specify the definition of the information associated with each attribute by referring to the attribute definition 16 in the distributed ledger 15, Since the communication device 20a is coupled to the node 10a, the contents of the definition associated with the attribute and the public key for decrypting the information encrypted by the other communication device 20 may be obtained from the node 10a as appropriate. Similarly, the communication device 20b acquires information such as the association between the attribute and the definition and the public key from the node 10b, and the communication device 20c acquires information such as the association between the attribute and the definition and the public key from the node 10c.

For example, it is assumed that holder 3 requests proof of his or her name from the issuer 2. The issuer 2 issues a certificate for the holder 3 by using the communication device 20a. At this time, the communication device 20a generates a digital certificate including an attribute of "name" (A1) and transmits the digital certificate to the communication device 20b (step S1).

On the other hand, it is assumed that the communication device 20b of the holder 3 receives a request for the information of the attribute (A10) called "full name" from the communication device 20c of the verifier 4. The communication device 20b acquires a definition for the attribute "full name" (A10) and a definition for the attribute "name" (A1) from the node 10b and compares the two. Both "full name" and "name" are associated with a character string representing the user's last name in Chinese characters. Therefore, the communication device 20b notifies the communication device 20c that the definition for the attribute "full name" (A10) and the definition for the attribute "name" (A1) are the same. The communication device 20b transmits the digital certificate acquired from the communication device 20a to the communication device 20c (step S2).

It is assumed that the communication device 20c appropriately acquires information recorded in the attribute definition 16 from the node 10c to determine that the definition is the same for the attribute=A10 (full name) and the attribute=A1 (name) The communication device 20c replaces the attribute=A1 (name) information in the digital certificate received from the communication device 20b with the attribute=A10 (full name) information and succeeds in the verification processing by using the digital certificate. For this reason, the communication device 20c may provide a service to the communication device 20b and the like.

Even if a plurality of communication devices 20 in the network use different attributes, if the definitions of the information associated with the attributes are the same, all the attributes represent the same information. The communication device 20 according to the embodiment may perform the verification processing by using the information associated with the attribute in the digital certificate with the same definition as the attribute of the requested information by acquiring the attribute definition 16 from the node 10 sharing the distributed ledger 15 including the attribute definition 16. For this reason, even if the communication device 20 that issues a certificate and the communication device 20 that verifies the certificate use different attribute definitions, the verification using a digital certificate may be performed.

FIG. 1 is an example, and modifications according to the implementation may be made. For example, the number of nodes 10 and communication devices 20 in the network may be randomly changed. The communication device 20 may perform encryption processing using a secret key as appropriate at the time of communication between the communication devices 20. When the received information is encrypted, the communication device 20 may perform verification processing or the like after decryption processing using a public key associated with the communication device 20 as a transmission source. Each of the issuer 2, the holder 3, and the verifier 4 may operate the communication device 20, or may control the communication device 20 via a terminal for operating the communication device 20.

Any of the communication devices 20 may issue, acquire, and verify a digital certificate. For example, the processing performed by each of the communication devices 20a to 20c may be performed by any communication device 20.

<Device Configuration>

Figure 2:
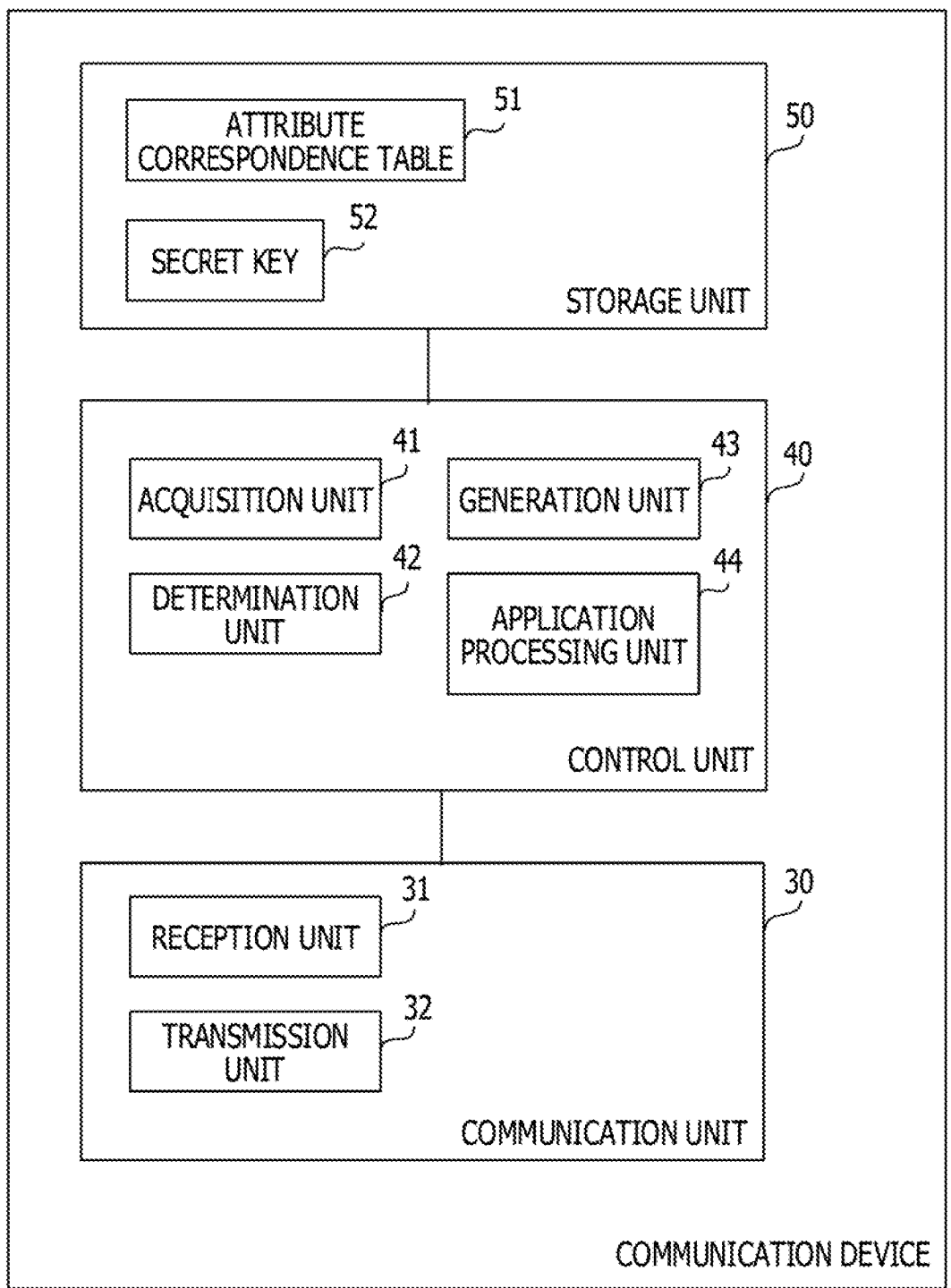
FIG. 2 is a diagram illustrating an example of a configuration of a communication device.

FIG. 2 is a diagram illustrating an example of a configuration of the communication device 20. The communication device 20 includes a communication unit 30, a control unit 40, and a storage unit 50, The communication unit 30 includes a reception unit 31 and a transmission unit 32. The reception unit 31 receives a packet from the node 10, a terminal, another communication device 20, or the like. The transmission unit 32 transmits a packet to the node 10, the terminal, another communication device 20, and the like.

The control unit 40 includes an acquisition unit 41, a determination unit 42, a generation unit 43, and an application processing unit 44, The acquisition unit 41 acquires from the node 10 the attribute included in the credential (digital certificate) and the definition of the attribute associated with the information requested from the other communication device 20. The determination unit 42 uses the information acquired from the node 10 to determine whether the definitions match among a plurality of attributes. When the determination unit 42 determines that the definitions match among the plurality of attributes, the generation unit 43 generates a message (attribute correspondence message) for associating the attributes determined to have matching definitions. The application processing unit 44 issues a credential and verifies the credential by using the application.

Figure 3:
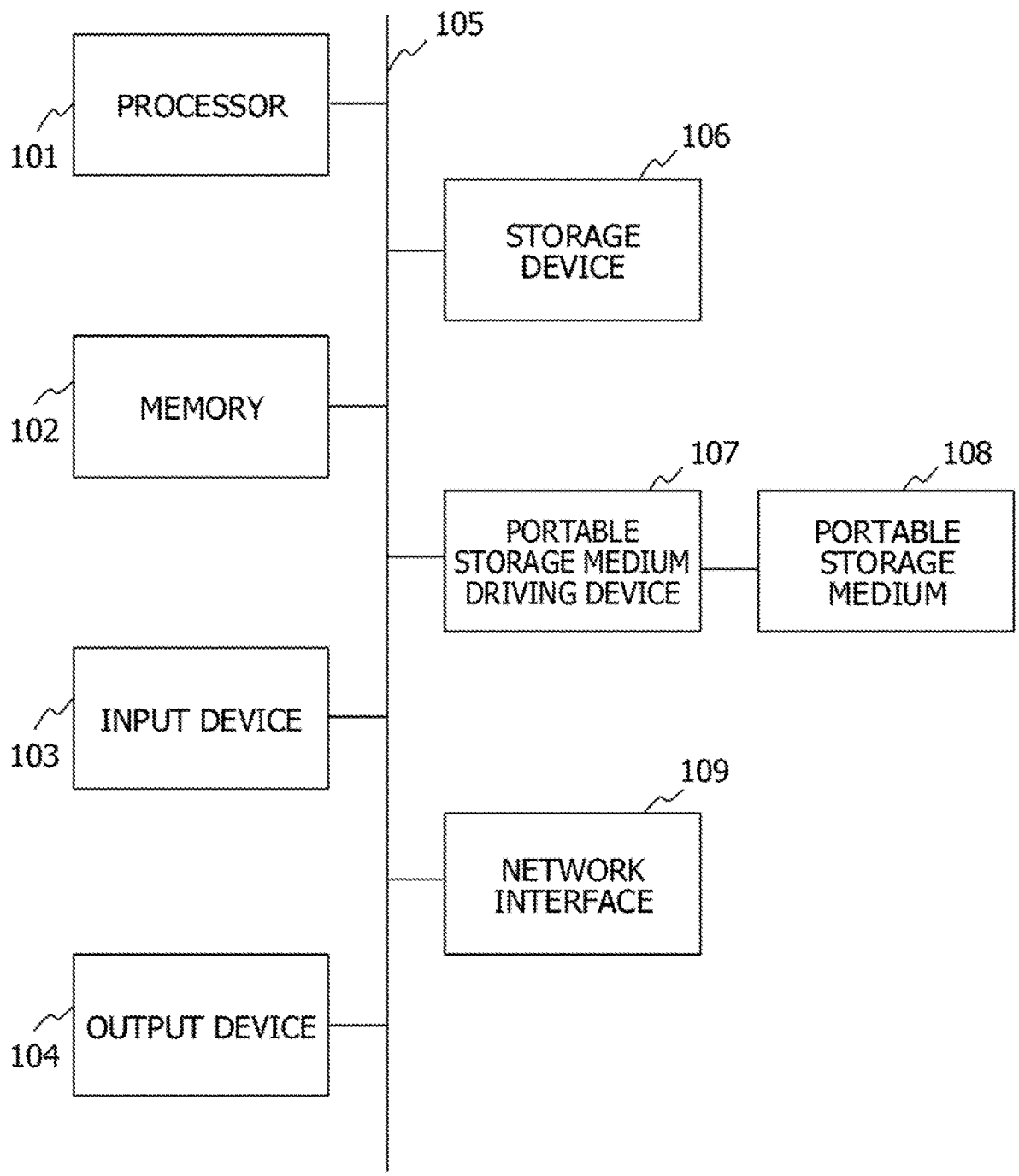
FIG. 3 is a diagram illustrating an example of a hardware configuration of the communication device.

The storage unit 50 has an attribute correspondence table 51 and a secret key 52. The attribute correspondence table 51 records the determination result acquired by the determination unit 42. The secret key 52 is used for encryption when the communication device 20 transmits a credential or the like to another communication device 20, FIG. 3 is a diagram illustrating an example of a hardware configuration of the communication device 20, The communication device 20 includes a processor 101, a memory 102, a bus 105, and a network interface 109. The communication device 20 may include one or more of an input device 103, an output device 104, a storage device 106, and a portable storage medium driving device 107.

The processor 101 is any processing circuit, and may be, for example, a central processing unit (CPU). The processor 101 operates as the control unit 40. The processor 101 may execute a program stored in the memory 102 or the storage device 106, for example. The memory 102 appropriately stores data acquired by the operation of the processor 101 and data used for the processing of the processor 101. The storage device 106 stores programs, data, and the like, and provides the stored information to the processor 101 or the like, as appropriate. The memory 102 and the storage device 106 operate as the storage unit 50 in the communication device 20.

The bus 105 couples the processor 101, the memory 102, the input device 103, the output device 104, the storage device 106, the portable storage medium driving device 107, and the network interface 109 to each other so that the data is able to be transmitted and received to and from each other. The input device 103 is any device used to input information, such as a keyboard, a mouse, a microphone, or a camera, and the output device 104 is any device used to output data, such as a display. The portable storage medium driving device 107 is able to output data in the memory 102, the storage device 106, and the like to a portable storage medium 108 and is able to read out programs, data, and the like from the portable storage medium 108. The portable storage medium 108 may be any portable storage medium including a compact disc recordable (CD-R) and a digital versatile disk recordable (DVD-R). The network interface 109 performs processing for the communication device 20 to communicate with another device as appropriate. The network interface 109 operates as the communication unit 30.

First Embodiment

Hereinafter, the first embodiment, an example of information shared by using the distributed ledger 15, acquisition of credentials, use of the acquired credentials, the processing in the communication device 20 that has received an attribute correspondence message, and the processing in the communication device 20 that has received the credentials will be described separately. In the following description, in order to clarify the communication device 20 that is performing the processing, the alphabet at the end of the code of the communication device 20 that is performing the processing may be added at the end of the code of the portion of the communication device 20. For example, a reception unit 31a is the reception unit 31 of the communication device 20a, and an acquisition unit 41b is the acquisition unit 41 of the communication device 20b.

(1) Example of Information Shared by Using the Distributed Ledger 15

FIG. 4 is a diagram illustrating an example of information shared by using the distributed ledger 15. The distributed ledger 15 includes the attribute definition 16 and the verification public key information 17. The attribute definition 16 includes an attribute definition ID, an attribute, and an attribute definition. The attribute definition 16 records, for all the attributes used by the communication device 20 coupled to any of the nodes 10 sharing the distributed ledger 15, the definition and information for identifying the attribute. Here, the attribute definition ID is identification information for identifying an attribute. The attribute definition is a definition of information represented by each attribute. For example, the attribute with the attribute definition ID=A1 is "name", and the last name is written in Chinese characters. Similarly, the attribute with the attribute definition ID=A2 is "issuer", and the identification information (Agent ID) assigned to the communication device 20 operating as a credential issuer is represented by a numeral. Attribute definition IDs and attribute definitions are similarly associated with other attributes.

In the example of FIG. 4, the last name may be represented by one of the attribute definition IDs=A1, A10, and A11. The attribute with the attribute definition ID=A1 is "name", the attribute with the attribute definition ID=A10 is "full name", and in each case, the attribute definition is associated with a last name in Chinese characters. Therefore, the information corresponding to the attribute definition ID=A1 and the information corresponding to the attribute definition ID=A10 have different attribute names, but may be used as compatible information for the same user or the like. On the other hand, the attribute with both the attribute definition ID=A1 and the attribute definition ID=A11 is "name", but the attribute definition associated with the attribute definition ID=A11 is a last name in Roman characters, Therefore, the information corresponding to the attribute definition ID=A1 and the information corresponding to the attribute definition ID=A11 have the same attribute name, but are not compatible with each other. The determination unit 42 of each communication device 20 may determine whether there is compatibility between the two attributes by appropriately comparing the attribute definitions of the plurality of attributes as described with reference to FIG. 4.

The verification public key information 17 is associated with a communication device, an Agent ID, a public key, and an address. Agent ID is identification information assigned to the communication device 20 in the entry. The public key is a public key that is a pair of the secret key used for encryption by the communication device 20 in the entry. The address is an address assigned to the communication device 20 in the entry. For example, Agent ID=3 and address=IPa are assigned to the communication device 20a, and the public key that is a pair of the secret key used by the communication device 20a is KeyB. Agent ID=1 and address=IPb are assigned to the communication device 20b, and the public key that is a pair of the secret key used by the communication device 20b is KeyD. Similarly, Agent ID=2 and address=IPc are assigned to the communication device 20c, and the public key that is a pair of the secret key used by the communication device 20c is KeyF.

The distributed ledger 15 may include information other than the attribute definition 16 and the verification public key information 17. Since the distributed ledger 15 is shared between the nodes 10 participating in the consortium 1, each of the communication devices 20 may acquire information in the distributed ledger 15 via the node 10 to which the communication device 20 is coupled.

(2) Acquisition of a Credential

Hereinafter, an example of credential acquisition processing in a case where the information illustrated in FIG. 4 is shared by using the distributed ledger 15 between the nodes 10 in the consortium 1 will be described. In the following description, it is assumed that the secret key used by the communication device 20a is KeyA, and the public key forming a pair with KeyA is KeyB. Similarly, it is assumed that the secret key used by the communication device 20b is KeyC, and the public key forming a pair with KeyC is KeyD. It is assumed that the secret key used by the communication device 20c is KeyE, and the public key forming a pair with KeyE is KeyF.

A schema definition 18 in FIG. 5 is an example of a credential format. The schema definition 18 records a schema ID and identification information of an attribute indicating a type of each information included in a credential. The schema ID is identification information for identifying the schema definition 18. In the example of FIG. 5, the schema ID is SC_1. The schema definition 18 identified by SC_1 also includes A2 and A1 as attribute identification information.

CL in FIG. 5 is an example of a credential generated by using the schema definition 18. The credential illustrated in the CL includes information such as schema ID=SC_1, A2=3, and A1=Suzuki. Therefore, the credential illustrated in the CL records that the credential is generated by the communication device 20a to which Agent ID=3 is assigned, by using the schema definition 18 with schema ID=SC_1 and that the last name of the user is "Suzuki". In addition to the credentials, identification information (credential ID) for identifying the credentials is also included in the credentials CL. CL in FIG. 5 is a credential having a credential ID=CID_1.

The schema definition 18 may be shared between the nodes 10 by using the distributed ledger 15. Each communication device 20 may previously store the schema definition 18 used when the own device issues a credential.

Figure 6:
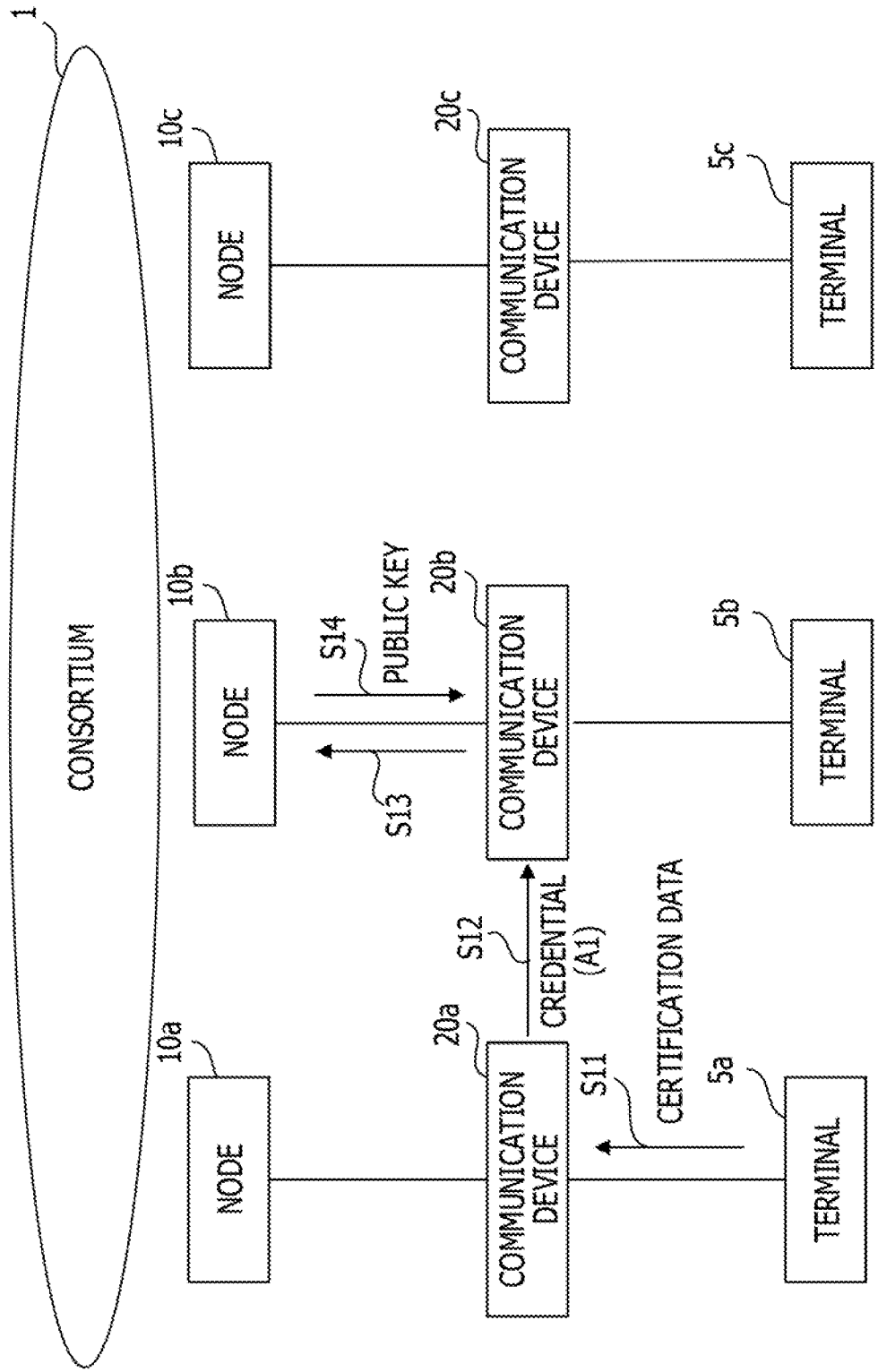
FIG. 6 is a diagram illustrating an example of a network.

FIG. 6 is a diagram illustrating an example of a network. In the example of FIG. 6, the node 10a, the node 10b, and the node 10c participate in the consortium 1. The communication device 20a is coupled to the node 10a, and the terminal 5a is coupled to the communication device 20a. In the following description, it is assumed that the terminal 5a is a terminal operated by the credential issuer 2. The communication device 20b is coupled to the node 10b, and the terminal 5b is coupled to the communication device 20b. In the following description, it is assumed that the terminal 5b is a terminal operated by the credential holder 3. The communication device 20c is coupled to the node 10c, and the terminal 5c is coupled to the communication device 20c. In the following description, it is assumed that the terminal 5c is a terminal operated by the credential verifier 4. FIG. 6 is an example of a network, and the number and coupling relationship of the nodes 10, the communication devices 20, and the terminals 5 may be changed to any form in which each of the communication devices 20 may be coupled to any of the nodes 10. For example, all three of the communication devices 20a to 20c may be coupled to the node 10b.

An example of processing performed when the holder 3 acquires a credential from the issuer 2 in the network of FIG. 6 will be described. First, the issuer 2 is notified that the holder 3 acquire a credential. This notification may be performed via the communication device 20 or the terminal 5, or may be performed by direct communication between the terminal 5b and the terminal 5a. Since any method by which the issuer 2 may recognize the target for issuing a credential may be used, for example, an application by email or mail from the holder 3 to the issuer 2 may be performed.

When recognizing that the holder 3 has requested the issuance of the credential, the issuer 2 transmits data (certification data) including the information certified by the credential from the terminal 5a to the communication device 20a (step S11). The terminal 5a transmits the address of the communication device 20b and the like to the communication device 20a together with the certification data as information about the transmission destination of the credential.

When receiving the certification data, the reception unit 31a of the communication device 20a outputs the data to an application processing unit 44a. The application processing unit 44a generates a credential according to the credential format. It is assumed that the communication device 20a stores the schema definition 18 illustrated in FIG. 5 in a storage unit 50a in advance. In this example, it is assumed that the application processing unit 44a has generated the credential illustrated in CL in FIG. 5. The application processing unit 44a encrypts the generated credential with the secret key 52a (KeyA). The transmission unit 32a transmits the encrypted credential to the communication device 20b (step S12).

The reception unit 31b of the communication device 20b outputs the received credential to an application processing unit 44b. Since the credential has been encrypted, the acquisition unit 41b requests the node 10b for the public key associated with the communication device 20a (step S13). The node 10b transmits the public key (KeyB) associated with the communication device 20a in response to the request from the acquisition unit 41b (step S14). For this reason, the application processing unit 44b may decrypt the credential by using the acquired public key.

(3) Use of the Acquired Credential

Hereinafter, an example of processing performed when the acquired credential is used will be described, by using a case where the holder 3 presents the credential acquired from the issuer 2 to the verifier 4 as an example. In the following example, it is assumed that the credential presented by the holder 3 to the verifier 4 is the credential CL illustrated in FIG. 5.

Figure 7:
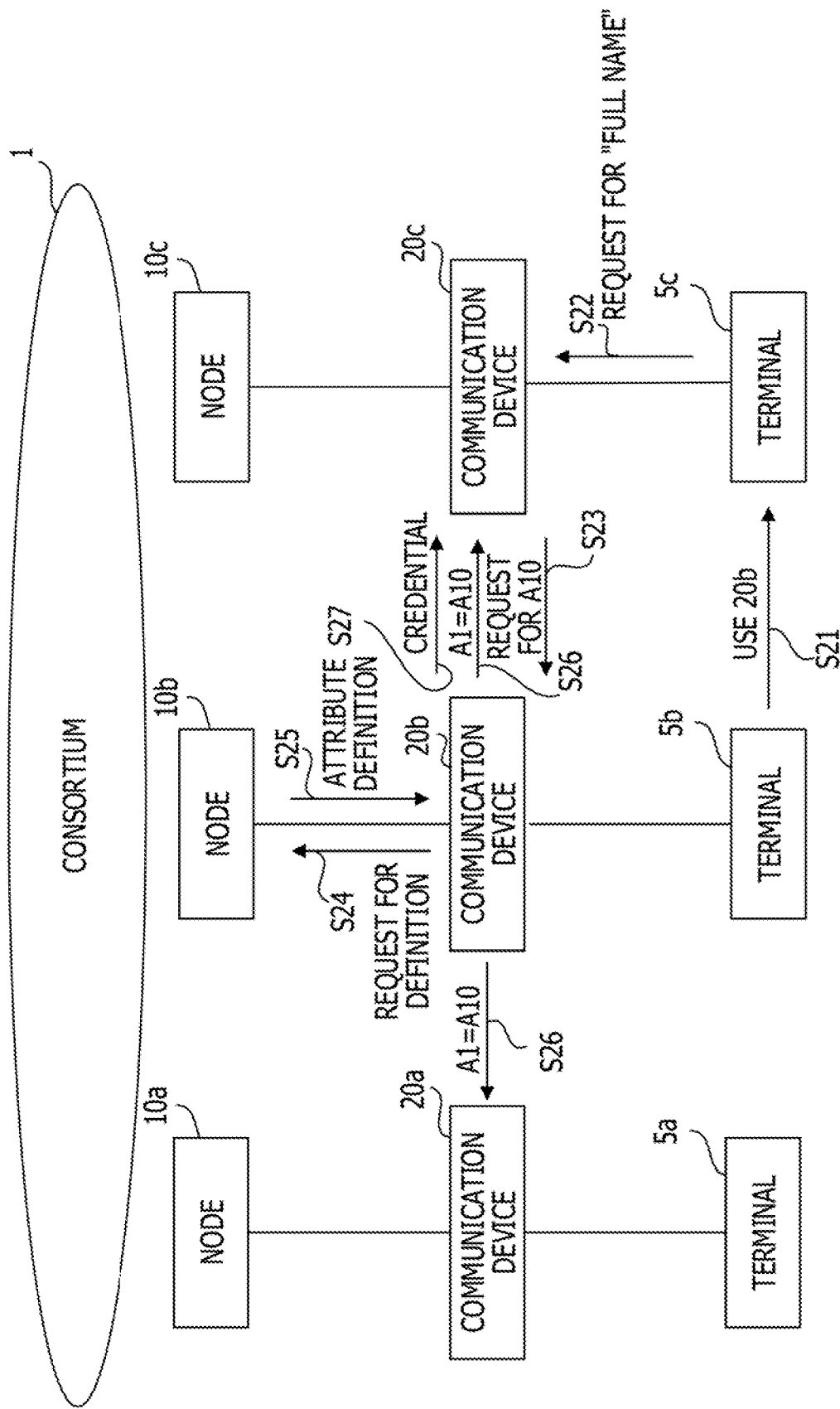
FIG. 7 is a diagram illustrating an example of processing performed for transmitting a credential.

FIG. 7 is a diagram illustrating an example of processing performed for transmitting a credential. By using the terminal 5b, the holder 3 who intends to present the credential notifies the terminal 5c used by the verifier 4 of information notifying that the communication device 20 communicating with terminal 5b is the communication device 20b (step S21). The terminal 5c recognizes, based on the information received from the terminal 5b, that the user using the terminal 5b intends to present the credential through the communication device 20b. The terminal 5c notifies the communication device 20c that the information of the user to be acquired is the full name of the user and that the request destination of the information is the communication device 20b (step S22).

When receiving the request from the terminal 5c, the reception unit 31c of the communication device 20c outputs the request to an application processing unit 44c. The application processing unit 44c specifies the attribute definition ID of the requested information and the address of the request destination. It is assumed that the application processing unit 44c stores in advance an attribute definition ID associated with an attribute of information acquired by the terminal 5c coupled to the communication device 20c. In this example, the application processing unit 44c assumes that the attribute definition ID for identifying the attribute "full name" requested by the terminal 5c is A10, When the address of the communication device 20b which is the request destination of the information is not stored in the storage unit 50, the application processing unit 44c requests the address of the communication device 20b from the node 10c. The node 10c returns the address assigned to the communication device 20b by referring to the verification public key information 17 in the distributed ledger 15. When the attribute definition ID corresponding to the requested information and the address of the request destination may be specified, the application processing unit 44c performs processing for presenting the attribute definition ID to the communication device 20 of the request destination of the information to request the information. In the example of FIG. 7, the application processing unit 44c transmits a request for information of the attribute definition ID=A10 to the communication device 20b via the transmission unit 32c (step S23).

The application processing unit 44b of the communication device 20b acquires the request for information of the attribute definition ID=A10 via the reception unit 31b. It is assumed that the attribute definition ID=A10 is not an attribute used in the terminal 5b, and is not used in the credentials received by the communication device 20b so far. The application processing unit 44b determines whether the requested attribute definition ID is associated with another attribute definition ID in the attribute correspondence table 51b. It is assumed that the attribute definition ID=A10 is not recorded in the attribute correspondence table 51b. The application processing unit 44b notifies the acquisition unit 41b and a determination unit 42b that the definition associated with the attribute definition ID=A10 is unknown.

The acquisition unit 41b requests the node 10b for the attribute definition associated with the attribute definition ID of the attribute included in the acquired credential, and the attribute definition associated with the attribute definition ID notified that the definition is unknown (step S24). In this example, the definition associated with the attribute definition ID=A10 is unknown. The communication device 20b has acquired the information of the attribute definition ID=A2 and A1 included in the credential CL (FIG. 5). The acquisition unit 41 requests the node 10 for the attribute definition for each of the attribute definition IDs=A1, A2, and A10.

When the requested attribute definition is specified by referring to the attribute definition 16 (FIG. 4) in the distributed ledger 15, the node 10b notifies the specified result to the acquisition unit 41b (step S15). In this example, the following three pieces of definition information are notified to the acquisition unit 41b.

Definition Information 1
Attribute definition ID=A1
Attribute=name
Attribute definition=last name, Chinese characters
Definition Information 2
Attribute definition ID=A2
Attribute=issuer
Attribute definition=Agent ID, numeral
Definition Information 3
Attribute definition ID=A10
Attribute=full name
Attribute definition=last name, Chinese characters The acquisition unit 41b outputs information acquired from the node 10b to the determination unit 42b.

The determination unit 42b compares the attribute definitions in the input information. Since the attribute definition ID of the attribute notified from the application processing unit 44b that the definition is unknown is A10, the determination unit 42 determines whether there is an attribute definition ID associated with the same attribute definition, by using the attribute definition associated with the attribute definition ID=A10 as a key. Since the attribute definition associated with the attribute definition ID=A10 is the notation of the last name in Chinese characters, the determination unit 42b determines that the attribute definition matches between the attribute definition ID=A10 and the attribute definition ID=A1. The determination unit 42b records the determination result in the attribute correspondence table 51b.

FIG. 8 is an example of the attribute correspondence table 51 generated when it is determined that the attribute definition matches between the attribute definition ID=A10 and the attribute definition ID=A1. The attribute correspondence table 51 associates combinations of two attributes having the same attribute definition. The two attributes having the same attribute definition are a combination of attributes that may be requested to be replaced for the communication device 20 that has requested the presentation of the information. Therefore, it may be said that the attribute correspondence table 51 records a combination of attributes that may be requested to be replaced for the communication device 20 that is the destination of the credential. Information on one of the combinations of the two attributes having the same attribute definition is recorded in the column of an attribute 1, and information about the other of the combinations of the two attributes having the same attribute definition is recorded in the column of an attribute 2. For each attribute, the attribute definition ID and the attribute are recorded. In FIG. 8, information of attribute definition ID=A1 is recorded in the column of the attribute 1. The attribute with the attribute definition ID=A1 is "name". On the other hand, the attribute with the attribute definition ID=A10 recorded in the column of the attribute 2 is "full name".

FIG. 9 is a diagram illustrating an example of an attribute correspondence message. When the determination in the determination unit 42*b* and the update of the attribute correspondence table 51*b* are performed, the generation unit 43*b* generates an attribute correspondence message for notifying another communication device 20 coupled to the node 10 belonging to the same consortium 1 of the determination result of the determination unit 42*b*. F1 in FIG. 9 is an example of information included in the attribute correspondence message. The attribute correspondence message includes a combination of a message creator ID and a corresponding attribute. The message creator ID is an Agent ID assigned to the communication device 20 that has generated the attribute correspondence message. The corresponding attribute is a combination of the attribute definition IDs determined by the determination unit 42 to have the same attribute definition, F1 is an example of information included in the attribute correspondence message, and the information in the attribute correspondence message may be changed depending on the implementation. When transmitting and receiving the attribute correspondence message, a header may be appropriately added to the payload including the information illustrated in F1.

F2 in FIG. 9 is an example of the attribute correspondence message generated by the generation unit 43*b* of the communication device 20*b* in the example described with reference to FIGS. 4 to 8. Since Agent ID=1 is assigned to the communication device 20*b*, the message creator ID is 1. Since it is determined that the attribute definition matches between the attribute definition ID=A10 and the attribute definition ID=A1, A1=A10 is recorded in the corresponding attribute.

The transmission unit 32*b* transmits the attribute correspondence message generated by the generation unit 43*b* to all the communication devices 20 whose coupling destination node 10 belonging to the same consortium 1 (step S26 in FIG. 7). When the address used to transmit the attribute correspondence message to all the communication devices 20 coupled to the node 10 belonging to the same consortium 1 is not stored in the storage unit 50*b*, the acquisition unit 41*b* acquires an address used for transmitting the attribute correspondence message from the node 10*b*. The node 10*b* may notify the acquisition unit 41*b* of the address used for transmitting the attribute correspondence message by appropriately referring to the verification public key information 17 (FIG. 4). A multicast address may be set for all the communication devices 20 whose coupling destination node 10 belonging to the same consortium 1 as destinations. In this case, each node 10 may notify the communication device 20 of the multicast address as the address used for transmitting the attribute correspondence message.

The application processing unit 44*b* determines that the credential CL (FIG. 5) including the attribute with the attribute definition ID=A1 may be used as the credential including the information of the attribute (attribute definition ID=A10) requested from the communication device 20*c*. After transmitting the attribute correspondence message, the application processing unit 44*b* transmits the credential CL via the transmission unit 32*b* (step S27 in FIG. 7). The application processing unit 44*b* also notifies the communication device 20*c* that the credential CL has been acquired from the communication device 20*a*. Since the application processing unit 44*b* transmits the credential CL received from the communication device 20*a*, the credential CL is encrypted with the secret key 52 (KeyA) of the communication device 20*a*.

Figure 10:
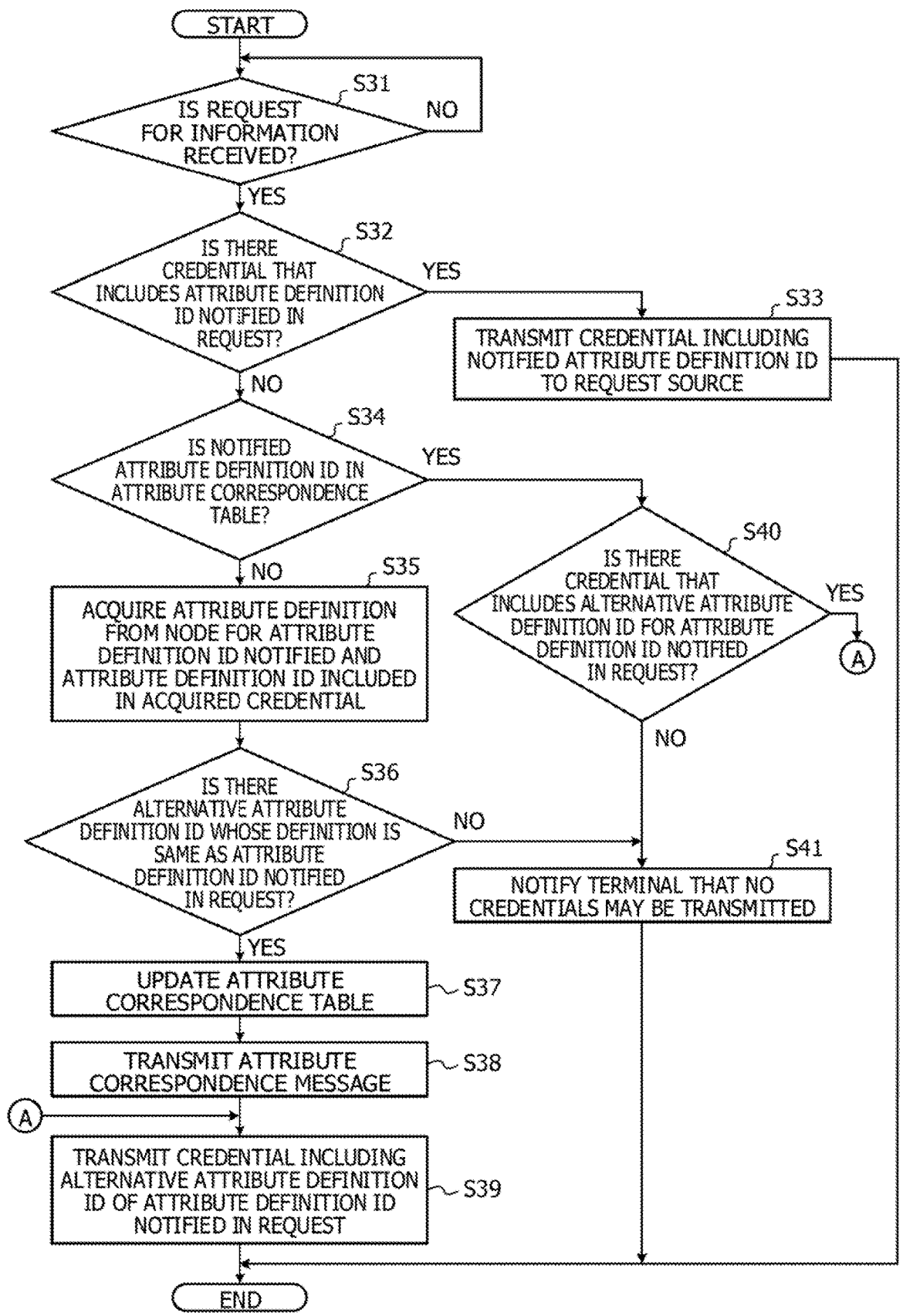
FIG. 10 is a flowchart illustrating an example of processing performed by the communication device requested for information.

FIG. 10 is a flowchart illustrating an example of processing performed by the communication device 20 that has been requested for information. FIG. 10 is an example of the processing, and the procedure of the processing may be changed according to the implementation. For example, the order of the processing in steps S37 and S38 may be changed with each other.

The reception unit 31 waits until an information request is received (No in step S31). When the reception unit 31 receives the information request, the application processing unit 44 determines whether there is a credential including the attribute definition ID notified in the request (Yes in step S31, step S32). If the credential including the attribute definition ID notified in the request is already acquired, the application processing unit 44 performs processing for transmitting the credential including the notified attribute definition ID to a request source (Yes in step S32, step S33).

On the other hand, if there is no credential including the attribute definition ID notified in the request, the application processing unit 44 determines whether the notified attribute definition ID is in the attribute correspondence table 51 (No in step S32, step S34). If the notified attribute definition ID is not in the attribute correspondence table 51, the communication device 20 is in a state of not knowing an attribute representing the same information as the attribute to which the notified attribute definition ID is assigned (No in step S34), The acquisition unit 41 acquires the attribute definition from the node 10 with respect to the notified attribute definition ID and the attribute definition ID included in the credential acquired by the communication device 20 (step S35). By using the information acquired from the node 10, the determination unit 42 determines whether there is an attribute definition ID with the same definition as the attribute definition ID notified in the request (step S36). In the following description, an attribute definition ID with the same attribute definition as the attribute definition ID notified in the request may be described as "alternative attribute definition ID".

When there is an attribute definition ID whose definition is equal to the attribute definition ID notified in the request, the determination unit 42 updates the attribute correspondence table 51 (Yes in step S36, step S37). For this reason, the attribute definition ID and the alternative attribute definition ID notified by the request are recorded in association with the updated attribute correspondence table 51. The attribute identified by the alternative attribute definition ID may be used as an alternative for the attribute identified by the attribute definition ID notified in the request during credential verification. The generation unit 43 transmits an attribute correspondence message in which the attribute definition ID notified in the request and the alternative attribute definition ID are associated (step S38). Thereafter, the application processing unit 44 transmits the credential including the alternative attribute definition ID of the attribute definition ID notified in the request to the request source (step S39).

On the other hand, if there is no attribute definition ID with the same definition as the attribute definition ID notified in the request, the determination unit 42 performs processing for notifying the terminal 5 that there is no credential that may be transmitted (No in step S36, step S41). For this reason, the user of the terminal 5 that has been notified that there is no credential that may be transmitted may appropriately acquire a new credential.

There is no credential including the attribute definition ID notified in the request, but when the notified attribute definition ID is in the attribute correspondence table 51, the communication device 20 may specify an attribute representing the same information as the attribute to which the notified attribute definition ID is assigned (Yes in step S34). The application processing unit 44 determines whether there is a credential including an alternative attribute definition ID of the attribute definition ID notified in the request (step S40). When there is no credential including the alternative attribute definition ID of the attribute definition ID notified in the request, the application processing unit 44 performs the processing of step S41 (No in step S40). When there is a credential including the alternative attribute definition ID of the attribute definition ID notified in the request, the application processing unit 44 performs the processing of step S39 (Yes in step S40).

Figure 11:
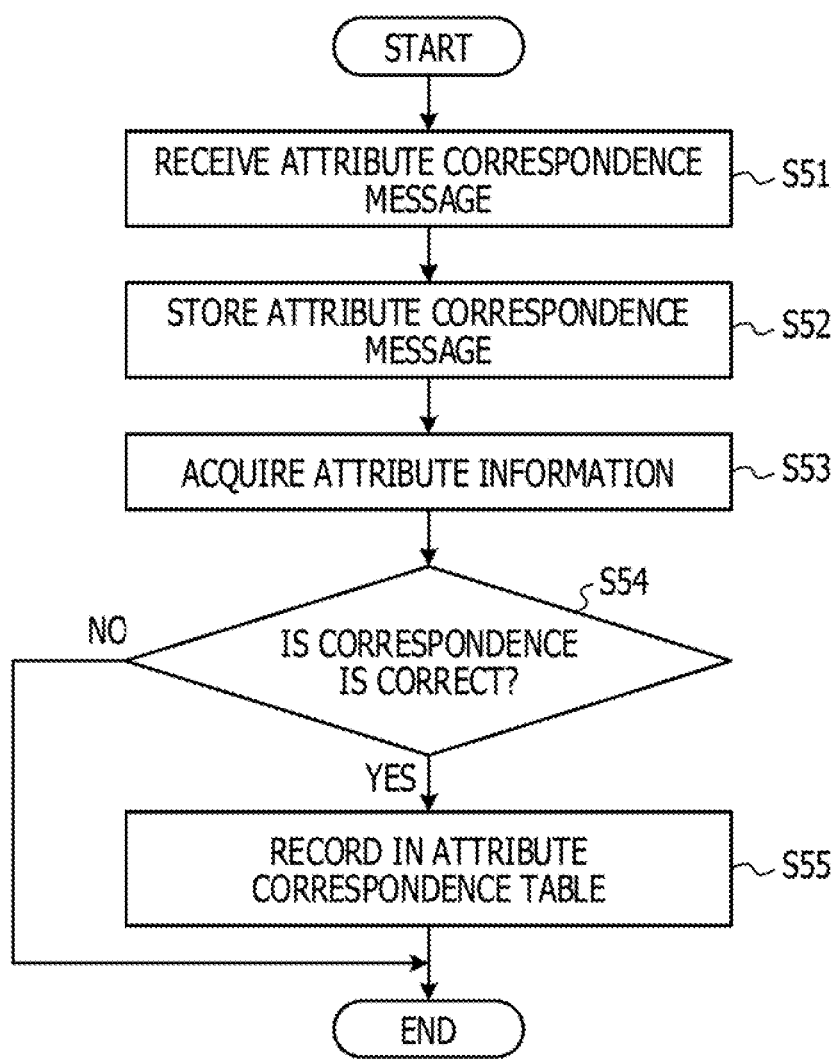
FIG. 11 is a flowchart illustrating an example of processing performed by the communication device that has received the attribute correspondence message.

(4) Processing in the Communication Device 20 that has Received the Attribute Correspondence Message FIG. 11 is a flowchart illustrating an example of processing performed by the communication device 20 that has received the attribute correspondence message. Hereinafter, an example of processing performed by the communication device 20a that has received the attribute correspondence message in step S26 of FIG. 7 will be described with reference to FIG. 11.

The reception unit 31a receives the attribute correspondence message (step S51). The storage unit 50 stores the attribute correspondence message (step S52). In the example described with reference to FIG. 7, the storage unit 50a stores an attribute correspondence message indicating that the attribute definitions match between the attribute definition ID=A10 and the attribute definition ID=A1.

The acquisition unit 41a acquires the attribute definition from the node 10 for each of the attribute definition IDs included in the attribute correspondence message (step S53). For this reason, in the example illustrated in FIG. 7, the acquisition unit 41a acquires the following two pieces of definition information.

Definition Information 1
Attribute definition ID=A1
Attribute=name
Attribute definition=last name, Chinese characters
Definition Information 2
Attribute definition ID=A10
Attribute=full name
Attribute definition=last name, Chinese characters A determination unit 42a determines whether the correspondence notified by the attribute correspondence message is correct (step S54). In the example illustrated in FIG. 7, in each of the attribute definition IDs included in the attribute correspondence message, the attribute definition is a notation of a last name in Chinese characters. Therefore, the correspondence notified by the attribute correspondence message is correct (Yes in step S54). For this reason, the determination unit 42a updates the attribute correspondence table 51a by using the information notified by the attribute correspondence message (step S55). Therefore, the following information is recorded in the attribute correspondence table 51a by the processing of step S55.

Attribute 1
Attribute definition ID=A1
Attribute=name
Attribute 2
Attribute definition ID=A10
Attribute=full name On the other hand, when it is determined that the correspondence notified by the attribute correspondence message is not correct, the determination unit 42 counts the number of times of processing without updating the attribute correspondence table 51 (No in step S54).

The above processing is performed in all the communication devices 20 that have received the attribute correspondence message. Therefore, in the example of FIG. 7, the communication device 20c performs the same processing as that of the communication device 20a by receiving the attribute correspondence message.

(5) Processing of the Communication Device 20 Receiving a Credential

Figure 12:
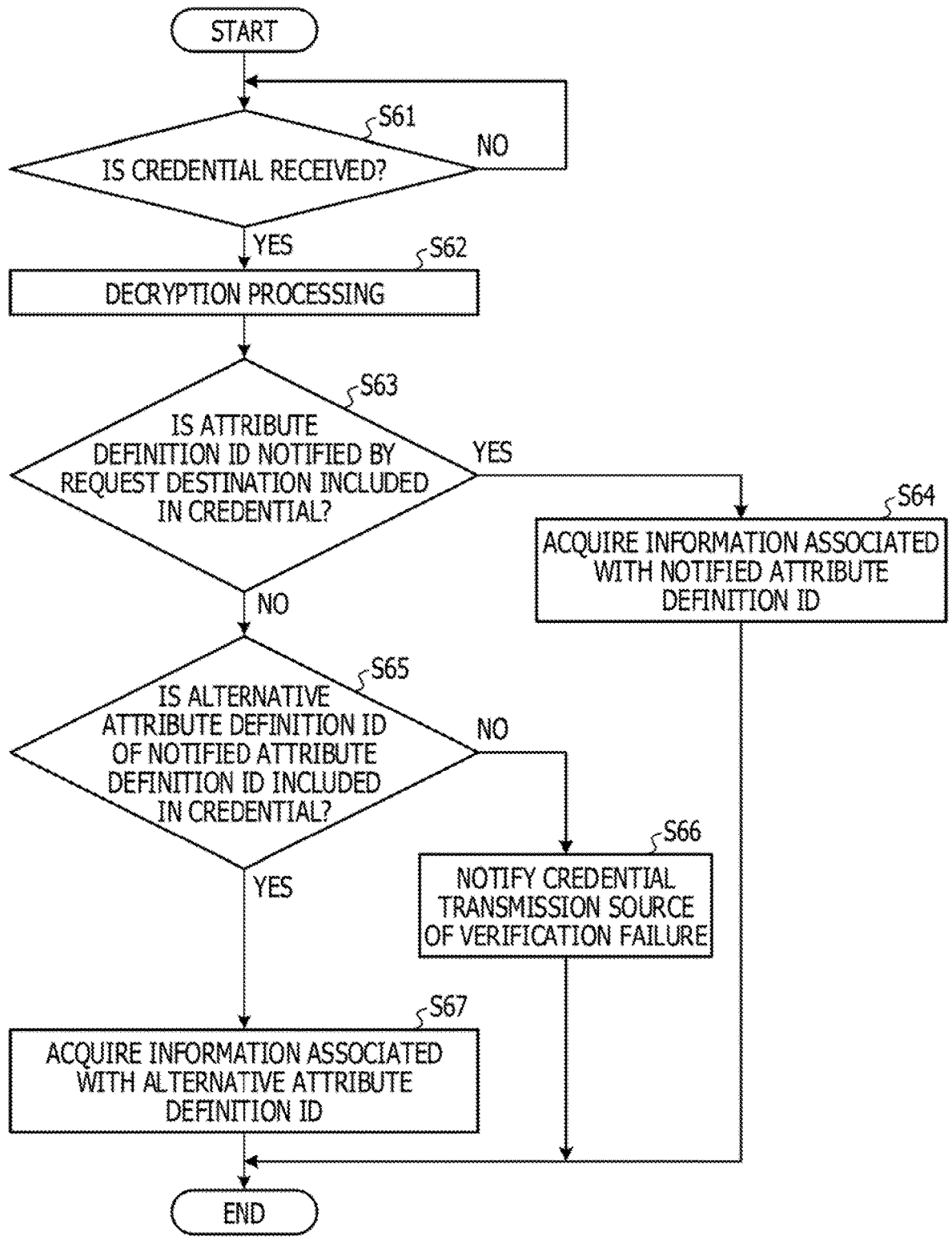
FIG. 12 is a flowchart illustrating an example of verification processing performed by the communication device.

FIG. 12 is a flowchart illustrating an example of verification processing performed by the communication device 20. Hereinafter, an example of processing performed by the communication device 20c that has received the credentials in step S27 of FIG. 7 will be described with reference to FIG. 12. At the time when the processing in FIG. 12 is performed, it is assumed that the fact that the attribute definition matches between the attribute definition ID=A10 and the attribute definition ID=A1 is recorded in the attribute correspondence table 51c.

The reception unit 31c waits until receiving a credential (No in step S61). When the reception unit 31c receives a credential, the application processing unit 44c performs decryption processing on the received credential (step S62). In the decryption processing, the acquisition unit 41c may acquire the public key KeyB associated with the communication device 20a that has generated the credential CL from the node 10c and may output the public key to the application processing unit 44c, The application processing unit 44c determines whether the attribute definition ID notified to the request destination of the information is included in the decrypted credential CL (step S63). If the attribute definition ID notified to the request destination of the information is included in the decrypted credential CL, the application processing unit 44c acquires information associated with the attribute definition ID notified to the request destination of the information (Yes in step S63, step S64).

If the attribute definition ID notified to the request destination of the information is not included in the decrypted credential CL, the application processing unit 44c determines whether the alternative attribute definition ID of the notified attribute definition ID is included in the credential (No in step S63, step S65). The alternative attribute definition ID is an attribute definition ID associated with the notified attribute definition ID in the attribute correspondence table 51c. When the alternative attribute definition ID of the notified attribute definition ID is included in the credential, the application processing unit 44c acquires information associated with the alternative attribute definition ID (Yes in step S65, step S67).

In the example described with reference to FIG. 7, the communication device 20c requests the information of the attribute definition ID=A10 from the communication device 20b, but the credential received from the communication device 20b does not include the attribute definition ID=A10, but includes the attribute definition ID=A1. Since the matching attribute definition between the attribute definition ID=A10 and the attribute definition ID=A1 is recorded in the attribute correspondence table 51c, A1 is an alternative attribute definition ID of A10. The application processing unit 44c acquires the information "Suzuki" associated with A1 of the credential CL (FIG. 5) as the "full name" of the user.

On the other hand, if neither the attribute definition ID notified to the request destination of the information nor the alternative attribute definition ID of the notified attribute definition ID is included in the credential, the application processing unit 44 determines that the requested information has not been notified (No in step S65). In this case, the application processing unit 44c notifies the transmission source of the credential of the verification failure (Step S66).

As described above, in the first embodiment, attribute replacement using the attribute correspondence table 51 is performed. For this reason, even if the attributes used for processing are different between the communication device 20 that has issued the credential and the communication device 20 that performs the verification, the attribute is replaced by using the attribute correspondence table 51, and the information in the received credential may be used for the verification processing. Therefore, the failure of the verification processing may be easily suppressed, the holder 3 may easily use the acquired credentials, and the verification processing is performed more efficiently.

According to the first embodiment, the communication device 20 that has specified that the attribute definitions are the same notifies another communication device 20 of the combination of attributes with the same attribute definition by using an attribute correspondence message. In each of the communication devices 20 that have received the attribute correspondence message, if the attribute correspondence message is confirmed to be correct by using the information in the distributed ledger 15, the attributes notified by the attribute correspondence message are associated with each other. For this reason, between the communication devices 20 coupled to the node 10 belonging to the same consortium 1, for the combination of the attributes notified by the attribute correspondence message, the attributes may be replaced by using the attribute correspondence table 51.

Second Embodiment

In a second embodiment, a case will be described in which the communication device 20 that has issued a credential and the communication device 20 that verifies the credential are coupled to the node 10 belonging to consortia different from each other.

Figure 13:
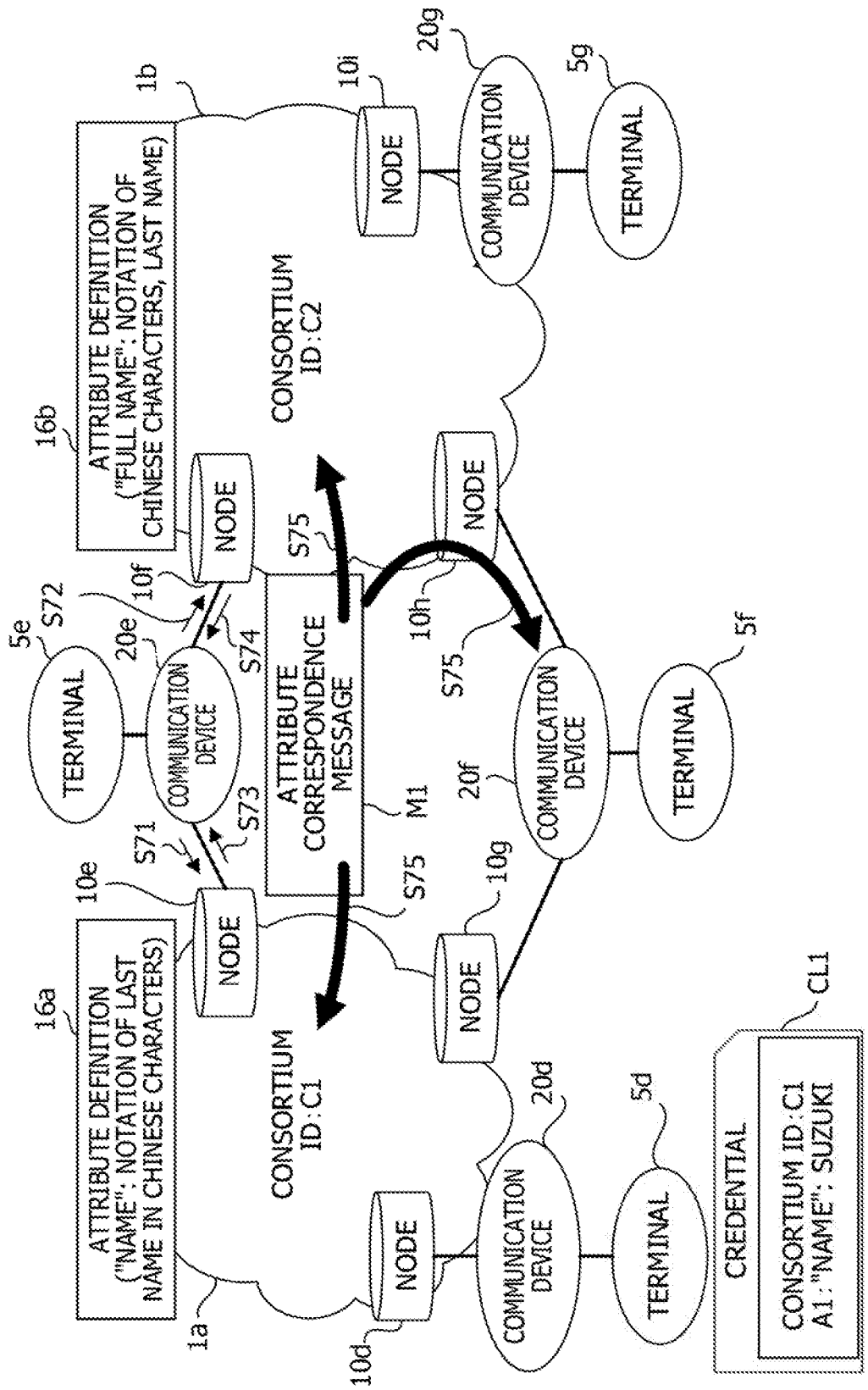
FIG. 13 is a diagram illustrating an example of communication performed in a second embodiment.

FIG. 13 is a diagram illustrating an example of communication performed in a second embodiment. The network illustrated in FIG. 13 includes a consortium 1a and a consortium 1b. ID=C1 is assigned to the consortium 1a, and ID=C2 is assigned to the consortium 1b. A node 10d, a node 10e, and a node 10g participate in the consortium 1a. A node 10f, a node 10h, and a node 10i participate in the consortium 1b. FIG. 13 illustrates a part of the nodes 10 participating in each consortium 1, and nodes 10 other than those illustrated are participating in all consortia 1.

A communication device 20d is coupled to the node 10d and a terminal 5d. The communication device 20g is coupled to the node 10i and a terminal 5g. A communication device 20e is coupled to the node 10e, the node 10f, and a terminal 5e. A communication device 20f is coupled to the node 10g, the node 10h, and a terminal 5f. The communication device 20e and the communication device 20f are both coupled to both the node 10 participating in the consortium 1a and the node 10 participating in the consortium 1b. Therefore, the communication device 20e and the communication device 20f may acquire both an attribute definition 16a shared by the consortium 1a and an attribute definition 16b shared by the consortium 1b. On the other hand, the communication device 20d does not refer to the information of the attribute definition 16b, and the communication device 20g does not refer to the information of the attribute definition 16a.

FIG. 14 is a diagram illustrating an example of the attribute definition 16 shared by each consortium 1. Also in the second embodiment, the nodes 10 participating in each consortium 1 share the attribute definition 16 and the verification public key information 17 by using the distributed ledger 15. In the following description, it is assumed that the attribute definition 16a is shared between the nodes 10 participating in the consortium 1a, and the attribute definition 16b is shared between the nodes 10 participating in the consortium 1b. For this reason, in the consortium 1a, the attribute with the attribute definition ID=A1 is "name", and the attribute definition is a notation of a last name in Chinese characters. On the other hand, in the consortium 1b, the attribute in which a notation of a last name in Chinese characters is defined as the attribute definition is "full name", and the attribute definition ID is A2. Attribute=attribute definition of the issuer is expressed in numerical notation of Agent ID in both attribute definition 16a and attribute definition 16b, but the attribute definition ID differs between the consortia 1.

Hereinafter, it is assumed that the issuer 2 uses the terminal 5d, the holder 3 uses the terminal 5e, and the verifier 4 uses the terminal 5g in the network of FIG. 13, It is assumed that the holder 3 has acquired a credential CL1 from the issuer 2, but does not have the credential generated based on the attribute definition 16b shared by the consortium 1b. The credential acquisition processing in the consortium 1 is as described in the first embodiment. Since the credential CL1 is generated according to the attribute definition 16a, the notation of the last name of the holder 3 in Chinese characters is recorded in association with the attribute definition ID=A1 (attribute=name). In the second embodiment, it is assumed that each communication device 20 includes the IDs of the consortia 1 sharing the attribute definition 16 used by the own device, in the credential. In the example of FIG. 13, since the communication device 20d uses the attribute definition 16a, the credential CL1 includes information of consortium ID=C1.

The case where the holder 3 using the terminal 5e is requested from the verifier 4 using the terminal 5g for information about the attribute definition ID=A2 (attribute=full name) will be described as an example. Communication between the terminal 5e and the terminal 5g and a request or an information element from the communication device 20g to which the terminal 5g is coupled are performed in the same manner as in the first embodiment. For example, the terminal 5e notifies the terminal 5g that the communication device 20e is being used, and the terminal 5g requests the communication device 20g to acquire information about "full name" from the communication device 20e.

In the attribute definition 16b (FIG. 14), since the attribute "full name" is associated with the attribute definition ID=A2, the application processing unit 44g of the communication device 209 determines to request the information of the attribute definition ID=A2. At this time, the application processing unit 44g notifies the communication device 20e of the ID of the consortium 1b together, Therefore, the application processing unit 44g performs processing for transmitting a request including the following information to the communication device 20e.

Transmission source: communication device 20g
Destination: communication device 20e
Attribute definition ID of the requested attribute: A2
ID of the consortium that defined the attribute: C2

An application processing unit 44e of the communication device 20e acquires a request for information of the attribute definition ID=A2 in the consortium 1b (ID=C2) via the reception unit 31e. The holder 3 using the terminal 5e does not have the credential generated based on the attribute definition 16b shared by the consortium 1b. Therefore, the communication device 20e does not have the credential including the consortium ID=C2. The application processing unit 44e determines whether the requested attribute definition ID is associated with another attribute definition ID in an attribute correspondence table 51e. It is assumed that attribute information corresponding to a combination of consortium ID=C2 and attribute definition ID=A2 is not recorded in the attribute correspondence table 51e, The application processing unit 44e notifies an acquisition unit 41e and a determination unit 42e that the definition associated with the combination of the consortium ID=C2 and the attribute definition ID=A2 is unknown.

The acquisition unit 41e inquires of the node 10e belonging to the consortium 1a about the attribute definition associated with the attribute definition ID included in the acquired credential CL1 (step S71). The acquisition unit 41e requests the node 10f included in the consortium 1b associated with the attribute definition ID, for the attribute definition associated with the attribute definition ID=A2 notified that the definition is unknown (step S72).

When specifying the requested attribute definition by referring to the attribute definition 16a (FIG. 14) in the distributed ledger 15a, the node 10e notifies the acquisition unit 41e of the specified result (step S73). At this time, the node 10e also notifies the ID of the consortium 1 to which the node 10e belongs. Therefore, in this example, the following definition information is notified from the node 10e to the acquisition unit 41e.

Definition Information 1
Consortium ID=C1
Attribute definition ID=A1
Attribute=name
Attribute definition=last name, Chinese characters Similarly, the node 10f specifies the requested attribute definition by referring to the attribute definition 16b (FIG. 14) in the distributed ledger 15b and notifies the acquisition unit 41e of the specified result (step S74). In this example, the following definition information is notified from the node 10f to the acquisition unit 41e.

Definition Information 1
Consortium ID=C2
Attribute definition ID=A2
Attribute=full name
Attribute definition=last name, Chinese characters The acquisition unit 41e outputs information acquired from each of the nodes 10e and 10f to the determination unit 42e.

The determination unit 42e compares the attribute definition associated with the attribute definition ID=A2 of the consortium ID=C2 notified that the definition is unknown with the attribute definition associated with the attribute definition ID=A1 of the consortium ID=C1. In this example, the notation of the last name of any attribute definition in Chinese characters is used. The determination unit 42e determines that the attribute definition in the attribute definition ID=A2 of the consortium ID=C2 matches the attribute definition in the attribute definition. ID=A1 of the consortium ID=C1. The determination unit 42e records the determination result in the attribute correspondence table 51e.

FIG. 15 is a diagram illustrating an example of an attribute correspondence table used in the second embodiment. Also in the second embodiment, the attribute correspondence table 51 associates combinations of two attributes having the same attribute definition with each other, but for each attribute, the ID of the consortium 1 in which the attribute is used is also recorded. For example, in the attribute correspondence table 51, the ID of the consortium, the attribute definition ID, and the attribute are recorded for each attribute. In FIG. 15, information of the attribute definition ID=A1 used in the consortium 1a with the consortium ID=C1 is recorded in the column of the attribute 1. The attribute with the attribute definition ID=A1 is "name". On the other hand, in the column of the attribute 2, information of the attribute definition ID=A2 used in the consortium 1b of the consortium ID=C2 is recorded. The attribute with the attribute definition ID=A2 in the consortium ID=C2 is "full name".

On the other hand, the generation unit 43e generates an attribute correspondence message M1 for notifying another communication device 20 of the determination result of the determination unit 42e. The generation unit 43e performs processing for transmitting the attribute correspondence message M1 to another communication device 20 coupled to the node 10 belonging to the consortium 1a and to another communication device 20 coupled to the node 10 belonging to the consortium 1b (step S75 in FIG. 13). The acquisition of the address information used when transmitting the attribute correspondence message M1 is performed in the same manner as in the first embodiment. The attribute correspondence message is transmitted to both the communication device 20 that may access the attribute definition 16 shared by one consortium 1 and the communication device 20 that may access a plurality of attribute definitions 16 shared by each of a plurality of consortia 1. Therefore, by the processing of step S75, all of the communication devices 20d, 20f, and 20g in FIG. 13 receive the attribute correspondence message M1.

FIG. 16 is a diagram illustrating an example of an attribute correspondence message used in the second embodiment. FIG. 16 illustrates an example of information included in the attribute correspondence message M1 transmitted in FIG. 13. The attribute correspondence message includes information indicating that the message type is an attribute correspondence message, a sender ID, information about the attribute 1, and information about the attribute 2. The attribute 1 and the attribute 2 are either of the two attributes determined to have the same attribute definition. Each of the attribute 1 and the attribute 2 includes the ID of the consortium 1 that defines the attribute, the attribute definition ID associated with the attribute, and the name of the attribute. FIG. 16 illustrates an example of the attribute correspondence message in the case where the attribute 1 is the attribute definition ID=A1 of the consortium ID=C1, and the attribute 2 is the attribute definition ID=A2 of the consortium ID=C2.

Figure 17:
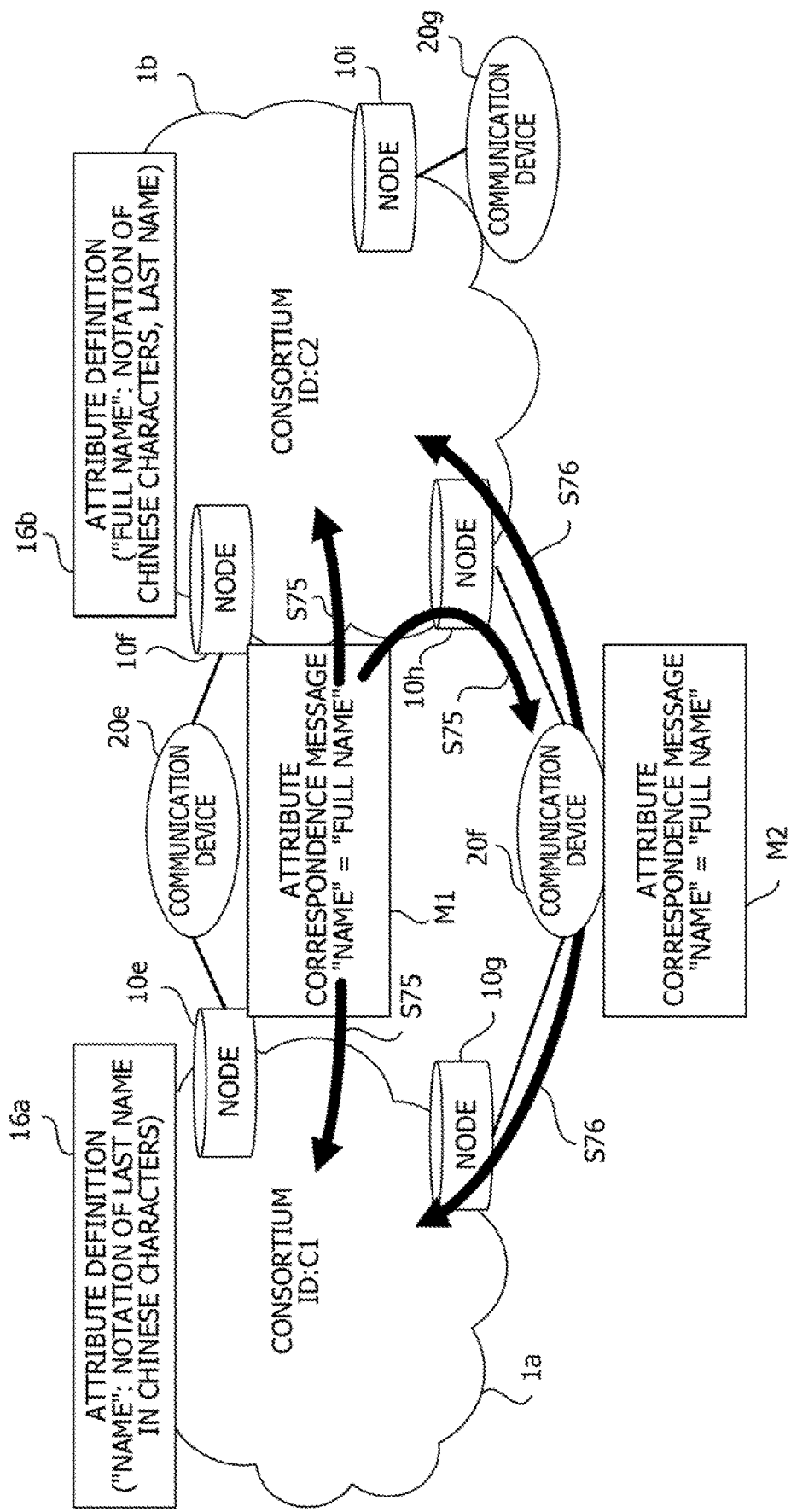
FIG. 17 is a diagram illustrating an example of processing performed in the second embodiment.

FIG. 17 is a diagram illustrating an example of processing performed in the second embodiment. FIG. 17 omits some of the devices in the network of FIG. 13 to make the drawing easier to see. The acquisition unit 41 of each communication device 20 that has received the attribute correspondence message M1 determines whether the own device may acquire the attribute definition 16 used in each of the two consortia (1a and 1b) whose ID is included in the attribute correspondence message M1.

If the communication device 20 does not refer to both information pieces of the attribute definitions 16 used in each of the two consortia (1a and 1b) identified by the ID in the attribute correspondence message M1, the communication device 20 does not determine whether the content of the received attribute correspondence message M1 is correct. The communication device 20 that does not refer to both the attribute definitions 16 used in each of the two consortia identified by the ID in the attribute correspondence message M1 counts the number of times of reception of the information for the correspondence notified by the attribute correspondence message. For example, the determination unit 42 of the communication device 20d and the communication device 20g does not determine whether the content of the attribute correspondence message M1 is correct, but counts the number of received pieces of information for each content of the attribute correspondence message. Therefore, upon receiving the attribute correspondence message M1, a determination unit 42g stores the following information.

Correspondence 1
ID of consortium that defined attribute 1=C1
Attribute definition ID of attribute 1=A1
ID of consortium that defined attribute 2=C2
Attribute definition ID of attribute 2=A2
Number of received pieces of information about correspondence 1: 1

The communication device 20d performs the same processing as the communication device 20g.

On the other hand, when the attribute definition 16 used in each of the two consortia (1a and 1b) identified by the ID in the attribute correspondence message M1 may be acquired, the communication device 20 performs processing of determining whether the content of the attribute correspondence message M1 is correct. For example, the communication device 20f may acquire the attribute definition 16 used in each of the two consortia (1a and 1b) identified by the ID in the attribute correspondence message M1. An acquisition unit 41f of the communication device 20f requests the node 10g participating in the consortium 1a for the attribute definition and the attribute of the attribute definition ID=A1. The acquisition unit 411 requests the node 10h participating in the consortium 1b for the attribute definition and the attribute of the attribute definition ID=A2.

The node 10g specifies the requested attribute definition by referring to the attribute definition 16a (FIG. 14) in the distributed ledger 15a and notifies the acquisition unit 41f of the specified result. Therefore, the following definition information is notified from the node 10g to the acquisition unit 41f.

Definition Information 1
Consortium ID=C1
Attribute definition ID=A1
Attribute=name
Attribute definition=last name, Chinese characters Similarly, the node 10h specifies the requested attribute definition by referring to the attribute definition 16b (FIG. 14) in the distributed ledger 15b and notifies the acquisition unit 41f of the specified result. In this example, the following definition information is notified from the node 10h to the acquisition unit 41f.

Definition Information 1
Consortium ID=C2
Attribute definition ID=A2
Attribute=full name
Attribute definition=last name, Chinese characters The acquisition unit 41f outputs information acquired from each of the nodes 10g and 10h to a determination unit 42f. For this reason, the determination unit 42f determines that the attribute definition in the attribute definition ID=A2 of the consortium ID=C2 matches the attribute definition in the attribute definition ID=A1 of the consortium ID=C1. If the determination result is not recorded in the attribute correspondence table 51f, since the determination unit 42f records the determination result in the attribute correspondence table 51f, the information illustrated in FIG. 15 is added to the attribute correspondence table 51f. The generation unit 43f generates an attribute correspondence message M2 for the two attributes included in the attribute correspondence message M1. The generation unit 431 performs processing for transmitting the attribute correspondence message M2 to another communication device 20 coupled to the node 10 belonging to the consortium 1a and to another communication device 20 coupled to the node 10 belonging to the consortium 1b (step S76). In order to avoid network congestion, when a message having the same content as the attribute correspondence message M2 has been transmitted within a predetermined period, the generation unit 43f does not transmit the attribute correspondence message M2.

When the determination unit 42 determines that the attribute definitions do not match, the generation unit 43 generates an attribute non-correspondence message. The attribute non-correspondence message is the same as in FIG. 16, but the message type is set to an attribute non-correspondence message. The attribute non-correspondence message is also transmitted to another communication device 20 coupled to the node 10 belonging to the consortium 1a and to another communication device 20 coupled to the node 10 belonging to the consortium 1b.

When the attribute correspondence message M2 is transmitted as illustrated in step S76, the communication devices 20 such as the communication device 20e, the communication device 20g, and the communication device 20d receive the attribute correspondence message M2. The attribute correspondence message M2 is processed in each communication device 20 in the same manner as the attribute correspondence message M1. Therefore, in the communication device 20 that may acquire both the information of the attribute definition 16a and the attribute definition 16b, it is determined whether the information of the attribute correspondence message M2 is correct. Among the communication devices 20 that have determined whether the information of the attribute correspondence message M2 is correct, the communication device 20 that has not transmitted an attribute correspondence message having the same content as the attribute correspondence message M2 within a predetermined period transmit the attribute correspondence message. On the other hand, in the communication device 20d and the communication device 20g, the attribute correspondence message M2 is processed in the same manner as the attribute correspondence message M1. Therefore, upon receiving the attribute correspondence message M2, the determination unit 42g in the communication device 20g updates the stored number of received pieces of information as follows, Correspondence 1
ID of consortium that defined attribute 1 C1
Attribute definition ID of attribute 1=A1
ID of consortium that defined attribute 2=C2
Attribute definition ID of attribute 2=A2
Number of received pieces of information about correspondence 1: 2

Figure 18:
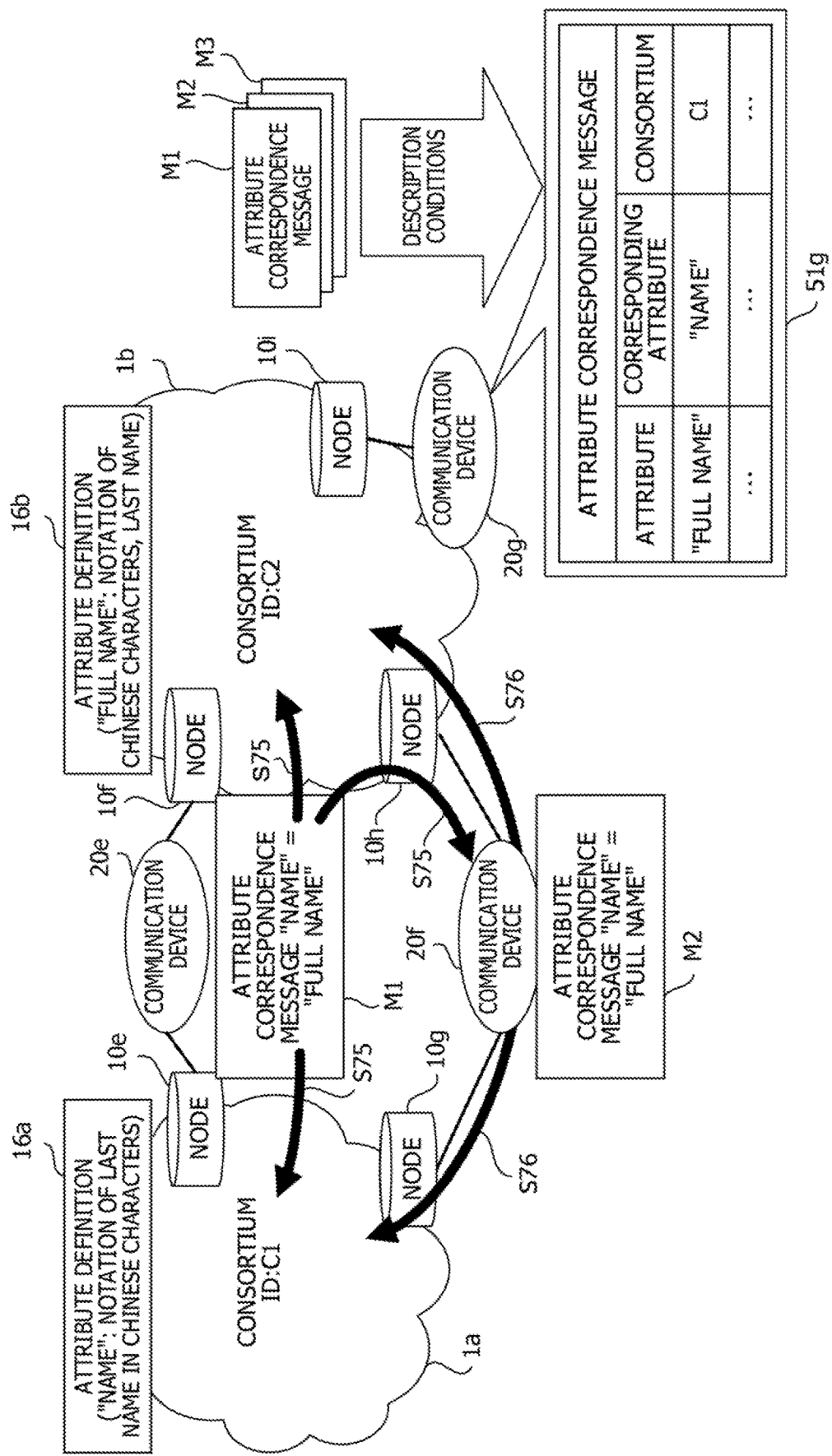
FIG. 18 is a diagram illustrating an example of processing performed in the second embodiment.

FIG. 18 is a diagram illustrating an example of processing performed in the second embodiment Each communication device 20 compares the number of received pieces of information about the correspondence of the attributes notified by the attribute correspondence message with a threshold Th1. The processing described with reference to FIG. 17 is performed by each communication device 20, and when the number of received pieces of information about the correspondence becomes equal to or greater than the threshold Th1, the number of communication devices 20 equal to or greater than the threshold Th1 has determined that the content of the attribute correspondence message is correct. When the number of received pieces of information for the correspondence is equal to or greater than the threshold Th1, the determination unit 42 of the device that does not determine whether the information notified by the attribute correspondence message is correct in the own device determines that the correspondence is correct, and updates the attribute correspondence table 51.

In the example of FIG. 18, it is assumed that the threshold Th1=3. It is assumed that the communication device 20g has received the attribute correspondence messages M1 to M3 indicating that the attribute definition in the attribute definition ID=A2 of the consortium ID=C2 matches the attribute definition in the attribute definition ID=A1 of the consortium ID=C1. The information notified by the attribute correspondence messages M1 to M3 is recorded in the attribute correspondence table 51g. In FIG. 18, a part of the information of the attribute correspondence table 51g is illustrated because of space limitation, but the attribute correspondence table 51g also has the same format as that of FIG. 15.

Figure 19:
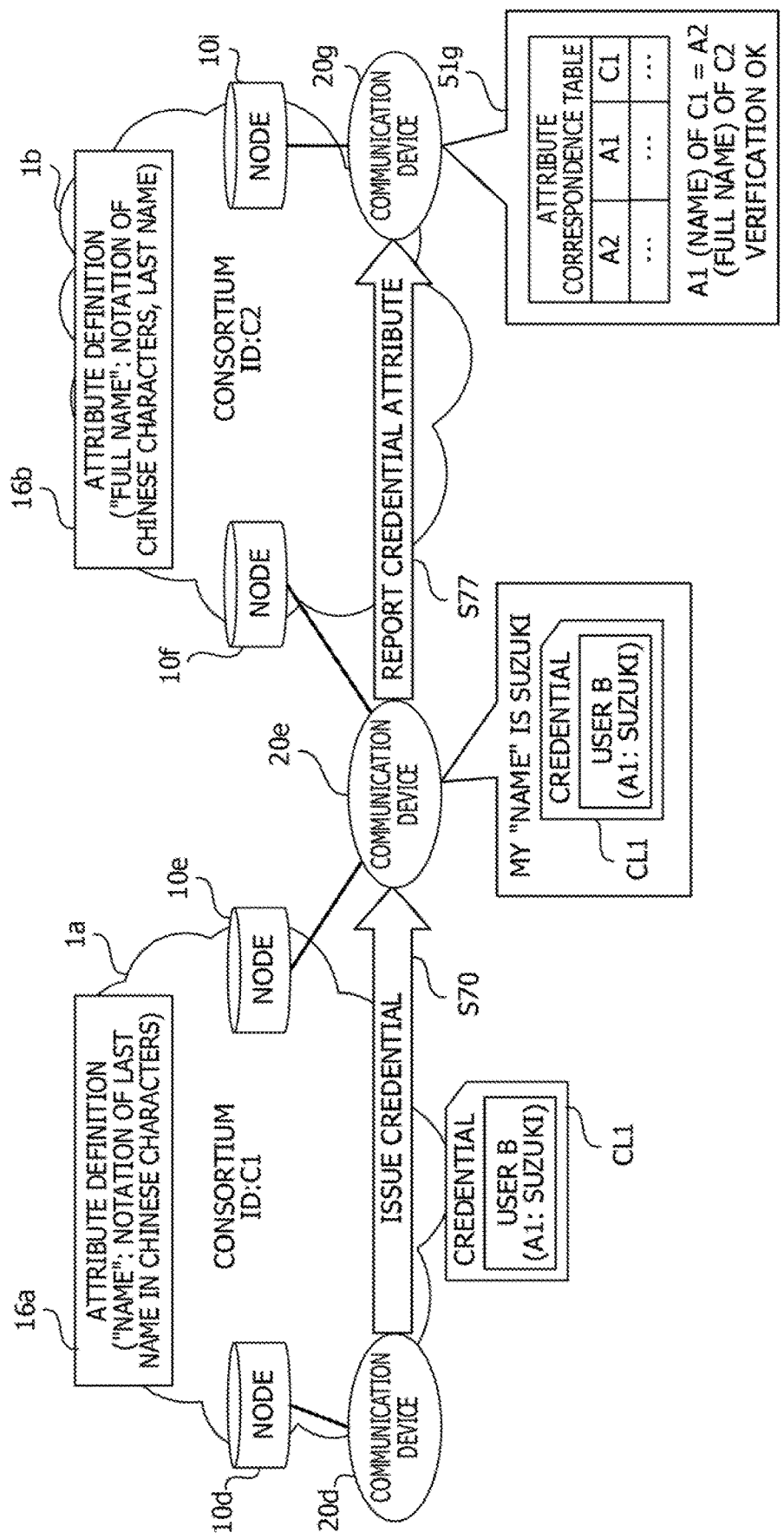
FIG. 19 is a diagram illustrating an example of credential transmission processing.

FIG. 19 is a diagram illustrating an example of credential transmission processing. FIG. 19 also illustrates some devices included in the network illustrated in FIG. 13. Before performing the processing described with reference to FIGS. 13 to 18, the communication device 20e has previously received the credential CL1 from the communication device 20d (step S70). It is assumed that the credential CL1 records that the information of the attribute definition ID=A1 is "Suzuki".

It is assumed that the fact that the attribute definition in the attribute definition ID=A2 of the consortium ID=C2 matches the attribute definition the attribute definition ID=A1 of the consortium ID=C1 is recorded in the attribute correspondence table 51g of the communication device 20g by the processing described with reference to FIGS. 13 to 18.

Thereafter, the application processing unit 44e of the communication device 20e transmits the credential al to the communication device 20g via a transmission unit 32e (step S77). At the time of step S77, since the attribute correspondence table 51g has been updated, the application processing unit 44g may recognize that the definition with the attribute definition ID=A1 in the consortium ID=C1 is the same as the definition with the attribute definition ID=A2 in the consortium ID=C2. The attribute definition ID=A1 (name) in the credential CL1 is replaced as the attribute definition ID=A2 (full name) in the consortium ID=C2 and processed. For this reason, the attribute and the attribute definition ID are different between the consortium 1a and the consortium 1b, but the communication device 20g succeeds in acquiring the information using the credential CL1.

As described above, in the second embodiment, even if the credential issuer and the verification device use different attribute definitions 16, the attribute using the attribute correspondence table 51 is replaced. Therefore, the failure of the verification processing may be easily suppressed, the holder 3 may easily use the acquired credentials, and the verification processing is performed more efficiently.

Figure 20:
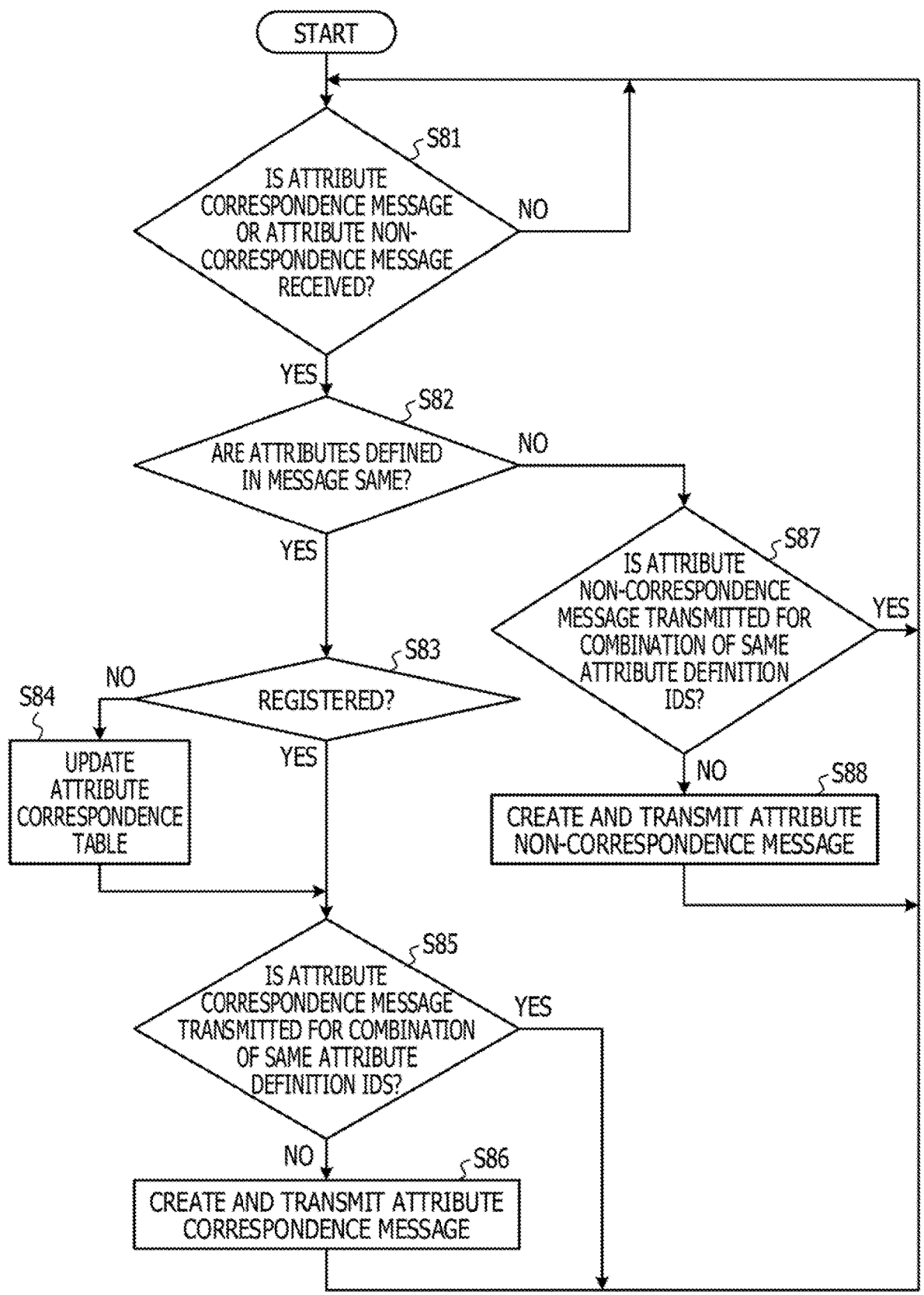
FIG. 20 is a flowchart illustrating an example of processing performed in the second embodiment.

FIG. 20 is a flowchart illustrating an example of processing performed in the second embodiment. FIG. 20 is an example of processing performed by the communication device 20 that may acquire two attribute definitions 16 including definitions for each of two attributes to be compared.

The reception unit 31 waits until an attribute correspondence message or an attribute non-correspondence message is received (No in step S81). Upon receiving the attribute correspondence message or the attribute non-correspondence message, the determination unit 42 determines whether the definitions of the two attributes described in the received message are the same (Yes in step S81, step S82). If the definitions corresponding to the two attributes in the message are the same, the determination unit 42 determines whether the same definition corresponding to the two attribute IDs in the received message has been registered in the attribute correspondence table 51 (Yes in step S82, step S83). If the same definition corresponding to the two attributes in the received message is not registered in the attribute correspondence table 51, the determination unit 42 updates the attribute correspondence table 51 (No in step S83, step S84). Thereafter, the generation unit 43 determines whether an attribute correspondence message for the combination of the same attribute definition IDs has been transmitted (step S85). If an attribute correspondence message for the combination of the same attribute definition IDs is not transmitted, an attribute correspondence message including a combination of attribute definition IDs determined to have the same definition is transmitted (No in step S85, step S86).

On the other hand, when the attribute correspondence message for the combination with the same attribute definition ID is transmitted, the process returns to step S81 (No in step S85). In step S83, if it is determined that a combination of attribute definition IDs determined to have the same definition is already registered in the attribute correspondence table 51 (Yes in step S83), the generation unit 43 performs the processing of step S85 and thereafter.

In step S82, the determination unit 42 determines that the definitions corresponding to the two attributes described in the received message are different (No in step S82). In this case, the generation unit 43 determines whether an attribute non-correspondence message for the combination of the same attribute definition IDs has been transmitted (step S87). If an attribute non-correspondence message for the combination of the same attribute definition IDs has been transmitted, the process returns to step S81 (Yes in step S87). If an attribute non-correspondence message for the combination of the same attribute definition IDs is not transmitted, the generation unit 43 transmits an attribute non-correspondence message including a combination of attribute definition IDs determined to have different definitions (No in step S87, step S88).

Figure 21:
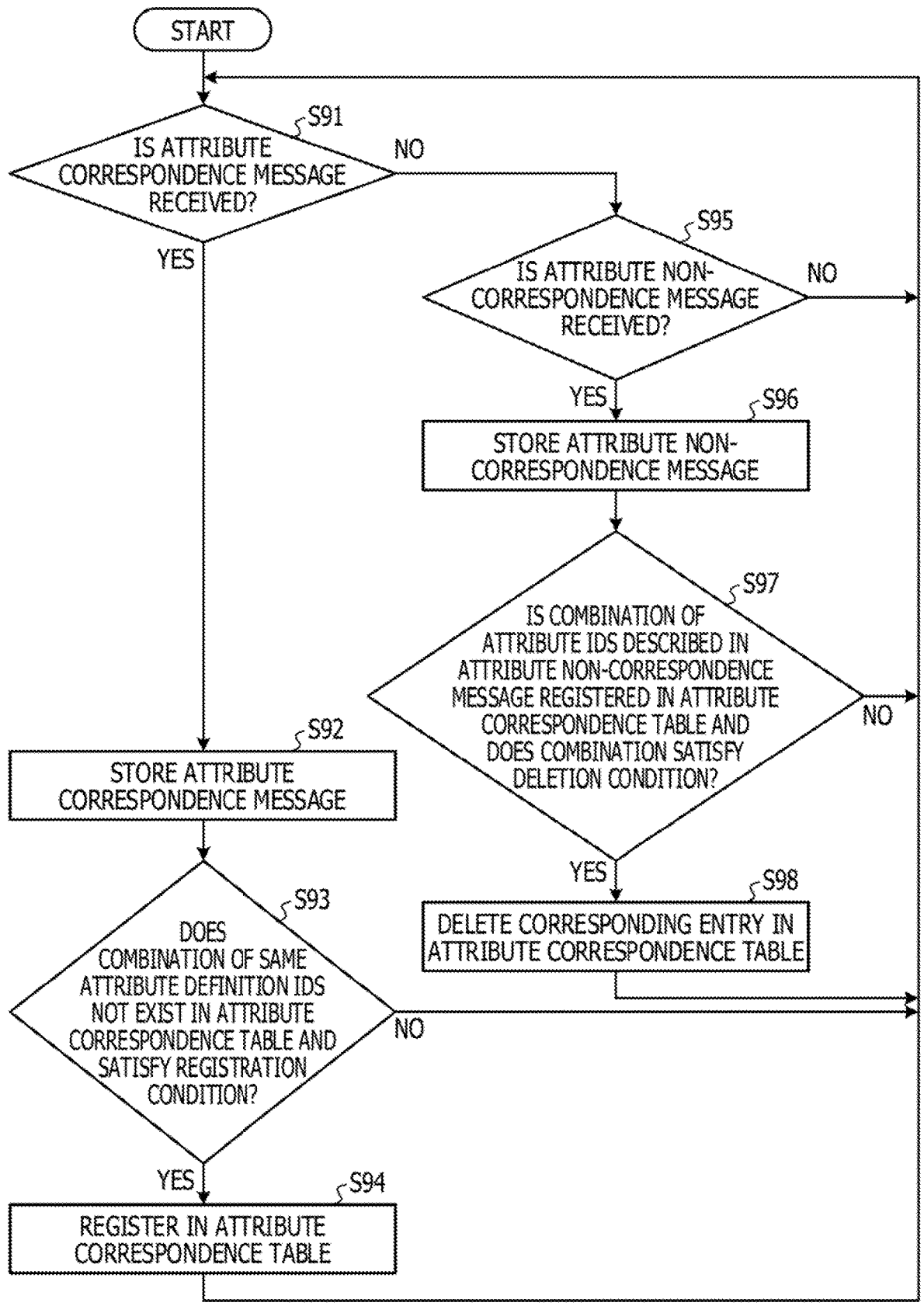
FIG. 21 is a flowchart illustrating an example of processing performed in the second embodiment.

FIG. 21 is an example of processing performed by the communication device 20 that may acquire one of the two attribute definitions 16 including the definition for each of the two attributes to be compared but does not acquire the other. In the example of FIG. 21, each communication device 20 stores, in addition to the threshold Th1, a threshold Th2 for comparing with the number of received attribute non-correspondence messages. The threshold Th2 may be different from the threshold Th1, or may be the same as the threshold Th1. It is assumed that the number of received attribute non-correspondence messages being equal to or greater than the threshold Th2 is stored in the communication device 20 as a deletion condition.

The acquisition unit 41 determines whether an attribute correspondence message has been received (step S91). When receiving the attribute correspondence message, the determination unit 42 stores the attribute correspondence message (Yes in step S91, step S92). The determination unit 42 determines whether the combination of the same attribute definition IDs as the received attribute correspondence message does not exist in the attribute correspondence table 51 and satisfies a registration condition (step S93). The registration condition is that the number of received attribute correspondence messages including the combination of the same attribute definition IDs as the received attribute correspondence message is equal to or greater than the threshold Th1. When the combination of the attribute definition IDs does not exist in the attribute correspondence table 51 and satisfies the registration condition, the determination unit 42 registers the combination of the same attribute definition IDs as the received attribute correspondence message in the attribute correspondence table 51 (Yes in step S93, step S94). Thereafter, the processing of step S91 and thereafter is repeated. If the combination of the attribute definition IDs exists in the attribute correspondence table 51 or does not satisfy the registration condition, the processing of step S91 and thereafter is repeated (No in step S93).

On the other hand, when it is determined that an attribute correspondence message has not been received, the acquisition unit 41 determines whether an attribute non-correspondence message has been received (No in step S91, step S95). If an attribute non-correspondence message has not been received, the processing of step S91 and thereafter is repeated (No in step S95). When an attribute non-correspondence message is received, the determination unit 42 stores the attribute non-correspondence message (Yes in step S95, step S96).

The determination unit 42 determines whether the combination of the same attribute definition IDs as the received attribute non-correspondence message has been registered in the attribute correspondence table 51 and satisfies the deletion condition (step S97). If the combination of the attribute definition IDs is registered in the attribute correspondence table 51 and satisfies the deletion condition, the determination unit 42 deletes the combination of the same attribute definition IDs as the received attribute non-correspondence message from the attribute correspondence table 51 (Yes in step S97, step S98). Thereafter, the processing of step S91 and thereafter is repeated. If the combination of the attribute definition IDs is not registered in the attribute correspondence table 51 or does not satisfy the deletion condition, the processing of step S91 and thereafter is repeated (No in step S97).

As described above, in the second embodiment, even if the credential issuer and the verification device use different attribute definitions 16, the attribute using the attribute correspondence table 51 is replaced. For this reason, even if the definitions of the attributes are different between the communication device 20 that has issued the credential and the communication device 20 that performs the verification, the attribute is replaced by using the attribute correspondence table 51, and the information in the received credential may be used for the verification processing. Therefore, the failure of the verification processing may be easily suppressed, the holder 3 may easily use the acquired credentials, and the verification processing is performed more efficiently.

<Others>

The embodiment is not limited to the above, and may be variously modified. Some examples thereof will be described below.

The trigger for the determination unit 42 to determine whether the two attributes have the same definition is not limited to the reception of a request for information from another communication device 20 or the reception of an attribute correspondence message or an attribute non-correspondence message. For example, when the application processing unit 44 has acquired a plurality of credentials, the determination unit 42 may be triggered to perform comparison processing between the information in the credentials and the attributes.

For example, in the first embodiment, it is assumed that the application processing unit 44*a* of the communication device 20*a* has acquired an address certification credential including the following information from a communication device 20*m* used in a city hall.

Credential ID=CID_2
Schema ID: SC_2
A1: Suzuki
A5: Kawasaki City, Kanagawa Prefecture Thereafter, it is assumed that the application processing unit 44*a* of the communication device 20*a* acquires a credential including the following information from a communication device 20*n* used in a driver's license center.

Credential ID=CID_3
Schema ID: SC_3
A4: Suzuki
A6: Kawasaki City, Kanagawa Prefecture The determination unit 42*a* compares a CID_2 credential with a CID_3 credential. Then, each credential has information of "Suzuki" and information of "Kawasaki City, Kanagawa Prefecture". The information "Suzuki" is associated with the attribute definition ID=A1 in the CID_2 credential, and is associated with the attribute definition ID=A4 in the CID_3 credential. The determination unit 42*a* determines that the attribute definition ID=A1 and the attribute definition ID=A4 are the same, and updates the attribute correspondence table 51*a* and transmits an attribute correspondence message. Similarly, the information "Kawasaki City, Kanagawa Prefecture" is associated with the attribute definition ID=A5 in the CID_2 credential, and is associated with the attribute definition ID=A6 in the CID_3 credential. The determination unit 42*a* determines that the attribute definition ID=A5 and the attribute definition ID=A6 are the same, and updates the attribute correspondence table 51*a* and transmits an attribute correspondence message.

Updating of the attribute correspondence table 51 and transmission of an attribute correspondence message by comparing a plurality of credentials may be performed in a system including a plurality of consortia 1 as in the second embodiment. In this case, since the attribute correspondence message includes the identification information of the consortium 1 where each attribute is used, the generation unit 43 generates an attribute correspondence message as illustrated in FIG. 16.

The formats of the tables, messages, credentials, and the like described above are only examples, and may be changed depending on the implementation. For example, tables, messages, and credentials may include information elements other than the information elements described above, and may not include some of the illustrated information elements.

In the above description, the processing performed by the communication device 20 is described separately for easy understanding, but any communication device 20 may issue, transmit, and verify a credential. In the second embodiment, any communication device 20 may issue, transmit, and verify a credential, create an attribute correspondence message or an attribute non-correspondence message, and update the attribute correspondence table 51.

The network used in the above description is an example, and the number of consortia 1 (clusters) in the network is any. Depending on the combination of the attribute definitions 16 to be compared, even the communication device 20 that may acquire the attribute definitions 16 in the plurality of consortia 1 may perform the processing illustrated in FIG. 21. For example, it is assumed that a communication device 20$x$ is coupled to nodes 10$x$ and 10$y$, the node 10$x$ participates in a consortium 1$x$, and the node 10$y$ participates in a consortium 1$y$. In this case, it is assumed that an attribute correspondence message is transmitted for a combination of the definition in an attribute definition 16$z$ used in a consortium 1$z$ and the definition in an attribute definition 16$x$ used in the consortium 1$x$. Since the communication device 20$x$ is not coupled to the node 10 sharing the attribute definition 16$z$, it is not a communication device 20 that may acquire the attribute definition 16$z$. At the time of processing this attribute correspondence message, the processing illustrated in FIG. 21 is performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a communication program causing a communication device to execute a process, the process comprising:
   acquiring a digital certificate from a first device coupled to any of a plurality of devices, the digital certificate including at least an attribute with respect to a user, the attribute including a first attribute identification and a corresponding attribute information, the plurality of devices sharing a distributed ledger having recorded therein one or more of correspondence information, each correspondence information indicating a relation between an attribute identification and a definition information corresponding to the attribute identification;
   upon receiving a request including a second attribute identification from a second device coupled to any of the plurality of devices, acquiring a first definition information associated with the first attribute identification, and a second definition information associated with the second attribute identification from any of the plurality of devices, the first definition information being information that includes a definition indicating a type of information allocated to a first attribute associated with the first attribute identification, the second definition information being information that includes a definition indicating a type of information allocated to a second attribute associated with the second attribute identification; and
   in response that the first definition information matches with the second definition information, transmitting the digital certificate including the attribute associated with the first attribute identification to the second device together with a message notifying that the first attribute identification and the second attribute identification have the same definition information, wherein the process further comprises:
   if the communication device is coupled to both a first coupling destination participating in a first cluster formed by the plurality of devices and a second coupling destination participating in a second cluster formed by a plurality of other devices sharing another distributed ledger,
   upon receiving a request for information associated with a fifth attribute identification from a third device coupled to any of the devices in the second cluster, acquiring a fifth definition associated with the fifth attribute identification from the second coupling destination; and
   when the first definition information and the fifth definition information match, notifying the third device that the first attribute identification used in the first cluster and the fifth attribute identification used in the second cluster have the same definition information and transmitting a digital certificate including information associated with the first attribute identification.

2. The non-transitory computer-readable storage medium according to claim 1, wherein
   the distributed ledger having recorded therein the correspondence between the attribute identification of the user information included in the digital certificate and the definition information of the attribute is shared by using a blockchain technology.

3. The non-transitory computer-readable storage medium according to claim 1, wherein the process further comprises:
   recording that the first attribute identification and the second attribute identification correspond to each other in a correspondence table;
   upon receiving another message notifying that a third attribute identification and a fourth attribute identification have the same definition information, acquiring a third definition information associated with the third attribute identification and a fourth definition information associated with the fourth attribute identification;
   when it is determined that the third definition information and the fourth definition information match, recording that the third attribute identification and the fourth attribute identification correspond to each other in the correspondence table; and
   when information about the fourth attribute identification is requested, determining to transmit another digital certificate including information about the third attribute identification to a request source of the information about the fourth attribute identification by using the correspondence table.

4. The non-transitory computer-readable storage medium according to claim 1, wherein
   the distributed ledger further has recorded therein address information of each device coupled to any of the devices in the first cluster,
   the other distributed ledger further has recorded address information of each device coupled to any of the devices in the second cluster, and
   when the first definition information and the fifth definition information match, the communication device transmits a notification message notifying that the first attribute identification used in the first cluster and the fifth attribute identification used in the second cluster have the same definition information, to a device coupled to any of the devices of the first cluster or the second cluster.

5. The non-transitory computer-readable storage medium according to claim 1, wherein the process further comprises:
upon receiving another notification message notifying that the first attribute identification used in the first cluster and a sixth attribute identification used in the second cluster have the same definition information,
acquiring a sixth definition information associated with the sixth attribute identification from the second coupling destination; and
when it is determined that the first definition information and the sixth definition information match, transmitting the other notification message to a device coupled to any of the devices of the first cluster or the second cluster.

6. The non-transitory computer-readable storage medium according to claim 5, wherein the process further comprises:
when the communication device is coupled to any of the devices in the first cluster, and is not coupled to a device in the second cluster, storing that the first attribute identification used in the first cluster and a sixth attribute used in the second cluster have the same definition when the number of times of reception of the other notification message exceeds a threshold.

7. A communication method implemented by a computer, the communication method comprising:
acquiring a digital certificate from a first device coupled to any of a plurality of devices, the digital certificate including at least an attribute with respect to a user, the attribute including a first attribute identification and a corresponding attribute information, the plurality of devices sharing a distributed ledger having recorded therein one or more of correspondence information, each correspondence information indicating a relation between an attribute identification and a definition information corresponding to the attribute identification;
upon receiving a request including a second attribute identification from a second device coupled to any of the plurality of devices, acquiring a first definition information associated with the first attribute identification, and a second definition information associated with the second attribute identification from any of the plurality of devices, the first definition information being information that includes a definition indicating a type of information allocated to a first attribute associated with the first attribute identification, the second definition information being information that includes a definition indicating a type of information allocated to a second attribute associated with the second attribute identification; and
in response that the first definition information matches with the second definition information, transmitting the digital certificate including the attribute associated with the first attribute identification to the second device together with a message notifying that the first attribute identification and the second attribute identification have the same definition information, wherein the process further comprises:
if the communication device is coupled to both a first coupling destination participating in a first cluster formed by the plurality of devices and a second coupling destination participating in a second cluster formed by a plurality of other devices sharing another distributed ledger,
upon receiving a request for information associated with a fifth attribute identification from a third device coupled to any of the devices in the second cluster, acquiring a fifth definition associated with the fifth attribute identification from the second coupling destination; and
when the first definition information and the fifth definition information match, notifying the third device that the first attribute identification used in the first cluster and the fifth attribute identification used in the second cluster have the same definition information and transmitting a digital certificate including information associated with the first attribute identification.

8. The communication method according to claim 7, wherein
the distributed ledger having recorded therein the correspondence between the attribute identification of the user information included in the digital certificate and the definition information of the attribute identification is shared by using a blockchain technology.

9. A communication device comprising:
a memory; and
circuitry coupled to the memory and configured to:
acquire a digital certificate from a first device coupled to any of a plurality of devices, the digital certificate including at least an attribute with respect to a user, the attribute including a first attribute identification and a corresponding attribute information, the plurality of devices sharing a distributed ledger having recorded therein one or more of correspondence information, each correspondence information indicating a relation between an attribute identification and a definition information corresponding to the attribute identification;
receive a request including a second attribute identification from a second device coupled to any of the plurality of devices;
acquire a first definition information associated with the first attribute identification, and a second definition information associated with the second attribute identification, from any of the plurality of devices, the first definition information being information that includes a definition indicating a type of information allocated to a first attribute associated with the first attribute identification, the second definition information being information that includes a definition indicating a type of information allocated to a second attribute associated with the second attribute identification; and
in response that the first definition information matches with the second definition information, transmit the digital certificate including the attribute associated with the first attribute identification to the second device together with a message notifying that the first attribute identification and the second attribute identification have the same definition information, wherein the process further comprises:
if the communication device is coupled to both a first coupling destination participating in a first cluster formed by the plurality of devices and a second coupling destination participating in a second cluster formed by a plurality of other devices sharing another distributed ledger,
upon receiving a request for information associated with a fifth attribute identification from a third device coupled to any of the devices in the second cluster, acquiring a fifth definition associated with the fifth attribute identification from the second coupling destination; and
when the first definition information and the fifth definition information match, notifying the third device that the first attribute identification used in the first cluster and the fifth attribute identification used in the second cluster have the same definition information and transmitting a digital certificate including information associated with the first attribute identification.

10. The communication device according to claim 9, wherein the distributed ledger having recorded therein the correspondence between the attribute identification of the user information included in the digital certificate and the definition information of the attribute identification is shared by using a blockchain technology.

\* \* \* \* \*